(12) United States Patent
Lee et al.

(10) Patent No.: US 10,643,051 B2
(45) Date of Patent: May 5, 2020

(54) OPTICS-BASED FINGERPRINT SENSOR, ELECTRIC DEVICE INCLUDING OPTICS-BASED FINGERPRINT SENSOR, AND OPERATION METHOD OF ELECTRIC DEVICE

(71) Applicant: SAMSUNG ELECTRONICS CO., LTD., Suwon-si (KR)

(72) Inventors: Minchul Lee, Seongnam-si (KR); Kwanhee Lee, Seoul (KR); Daeyoung Chung, Seoul (KR); Sanghyun Cho, Hwaseong-si (KR); Wonho Cho, Suwon-si (KR); Hayoung Ko, Seoul (KR); Jongsung Lee, Suwon-si (KR); Heechang Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 15/978,586

(22) Filed: May 14, 2018

(65) Prior Publication Data
US 2019/0019000 A1    Jan. 17, 2019

(30) Foreign Application Priority Data

Jul. 13, 2017   (KR) .......................... 10-2017-0089143
Jan. 5, 2018   (KR) .......................... 10-2018-0001861
Jan. 23, 2018   (KR) .......................... 10-2018-0008187

(51) Int. Cl.
*G06K 9/28* (2006.01)
*G06K 9/00* (2006.01)
(Continued)

(52) U.S. Cl.
CPC ............. *G06K 9/0004* (2013.01); *G02B 5/20* (2013.01); *G02B 5/204* (2013.01); *G02B 27/0955* (2013.01); *G06F 3/0412* (2013.01); *G06F 21/32* (2013.01); *H01L 25/167* (2013.01); *H01L 27/14605* (2013.01); *H01L 27/14678* (2013.01)

(58) Field of Classification Search
CPC .... G06K 9/00006–0012; G06K 9/0004; G06F 21/32
See application file for complete search history.

(56) References Cited

U.S. PATENT DOCUMENTS 7,505,613 B2   3/2009   Russo
8,203,635 B2   6/2012   Lee
(Continued)

FOREIGN PATENT DOCUMENTS

KR   10-2015-0079583 A   7/2015
KR   10-2015-0131944 A   11/2015
KR   10-2016-0029697 A   3/2016

*Primary Examiner* — Brian Werner
(74) *Attorney, Agent, or Firm* — Sughrue Mion, PLLC

(57) ABSTRACT

An optics-based fingerprint sensor may include a first photodiode, a first metal shield structure that is formed on the first photodiode and includes a first opening, a first color filter structure that is formed on the first metal shield structure and including a second opening exposing the first opening, a second photodiode that is spaced apart from the first photodiode by a predetermined distance, a first nano-optical filter structure that is formed on the second photodiode, and a first band limit filter structure that is formed on the nano-optical filter structure.

20 Claims, 26 Drawing Sheets

(51) Int. Cl.

| | |
|---|---|
| *H01L 25/16* | (2006.01) |
| *G02B 27/09* | (2006.01) |
| *G06F 21/32* | (2013.01) |
| *G06F 3/041* | (2006.01) |
| *G02B 5/20* | (2006.01) |
| *H01L 27/146* | (2006.01) |

(56) References Cited

U.S. PATENT DOCUMENTS

| | | | |
|---|---|---|---|
| 8,284,019 B2* | 10/2012 | Pishva | G06K 9/0012 |
| | | | 340/5.2 |
| 9,137,438 B2 | 9/2015 | Erhart et al. | |
| 9,274,553 B2 | 3/2016 | Erhart et al. | |
| 9,336,428 B2 | 5/2016 | Erhart | |
| 2006/0115128 A1* | 6/2006 | Mainguet | G06K 9/00026 |
| | | | 382/115 |
| 2007/0014443 A1 | 1/2007 | Russo | |
| 2008/0048102 A1* | 2/2008 | Kurtz | H01L 31/0547 |
| | | | 250/226 |
| 2010/0271516 A1 | 10/2010 | Lee | |
| 2011/0102567 A1 | 5/2011 | Erhart | |
| 2011/0261191 A1* | 10/2011 | Byren | G01S 7/4816 |
| | | | 348/135 |
| 2012/0242635 A1 | 9/2012 | Erhart et al. | |
| 2013/0258086 A1 | 10/2013 | Erhart et al. | |
| 2014/0068740 A1 | 3/2014 | LeCun et al. | |
| 2015/0144770 A1* | 5/2015 | Choi | G01N 21/29 |
| | | | 250/208.1 |
| 2015/0381907 A1 | 12/2015 | Boettiger et al. | |
| 2016/0266695 A1* | 9/2016 | Bae | G06F 1/1643 |
| 2018/0356915 A1* | 12/2018 | Yeke Yazdandoost | |
| | | | G06F 3/042 |

\* cited by examiner

OPTICS-BASED FINGERPRINT SENSOR, ELECTRIC DEVICE INCLUDING OPTICS-BASED FINGERPRINT SENSOR, AND OPERATION METHOD OF ELECTRIC DEVICE

CROSS-REFERENCE TO THE RELATED APPLICATIONS

This application claims priority from Korean Patent Application No. 10-2017-0089143, filed on Jul. 13, 2017 in the Korean Intellectual Property Office, Korean Patent Application No. 10-2018-0001861, filed on Jan. 5, 2018 in the Korean Intellectual Property Office, and Korean Patent Application No. 10-2018-0008187, filed on Jan. 23, 2018, in the Korean intellectual property Office, the disclosures of which are incorporated herein by reference in their entireties.

BACKGROUND

1. Field

Apparatuses and methods consistent with example embodiments relate to an electronic device, and more particularly, relate to an optics-based fingerprint sensor, an electronic device including the optics-based fingerprint sensor, and an operation method of the electronic device.

2. Description of the Related Art

Electronic devices provide various functions, based on operations of various electronic circuits/modules/chips included therein. Electronic devices such as a computer, a smartphone, a tablet, and the like include electronic circuits, modules, or chips for the purpose of providing various functions.

As the security of an electronic device becomes more important, the electronic device may perform various user authentication functions to provide a service only to an authenticated user. For example, fingerprint detection and recognition is one of the widely used methods of user authentication. The electronic device may provide user authentication by detecting the user's fingerprint and determining whether the detected user fingerprint matches an authentication fingerprint (i.e., reference fingerprint data) stored in advance.

Conventionally, fingerprint recognition methods have included a capacitive detection method and an optics-based detection method. In the case of the optics-based fingerprint recognition method, the level of security may be relatively low because the user fingerprint can be more easily replicated (or duplicated).

SUMMARY

Embodiments of the present disclosure provide an optics-based fingerprint sensor with improved security, an electronic device including the optics-based fingerprint sensor, and an operation method of the electronic device, by determining whether a recognized fingerprint is a fingerprint coming from a finger of a real person or a fake fingerprint, in recognition and detection of a user fingerprint.

According to an aspect of an example embodiment, an optics-based fingerprint sensor includes a first photodiode, a first metal shield structure that is formed on the first photodiode and includes a first opening, a first color filter structure that is formed on the first metal shield structure and includes a second opening exposing the first opening, a second photodiode that is spaced apart from the first photodiode by a predetermined distance, a first nano-optical filter structure that is formed on the second photodiode, and a first band limit filter structure that is formed on the nano-optical filter structure.

According to an aspect of an example embodiment, an optics-based fingerprint sensor may include a first fingerprint pixel that outputs a first signal, based on a first intensity of light reflected from a user fingerprint; a first spectrum pixel that outputs a second signal, based on a second intensity of first narrow band light, which has a first wavelength, of the reflected light; and a sensor driver. The sensor driver may be configured to control the first fingerprint pixel and the first spectrum pixel, to generate fingerprint image information about the user fingerprint, based on the first signal, and generate fingerprint spectrum information about the user fingerprint, based on the second signal.

According to an aspect of an example embodiment, an electronic device may include a display panel including a plurality of display pixels, and an optics-based fingerprint sensor configured to generate fingerprint image information and fingerprint spectrum information, based on reflected light. The reflected light may be light emitted from at least one display pixel of the plurality of display pixels and reflected from a user fingerprint. The optics-based fingerprint sensor may include a plurality of fingerprint pixels each configured to generate a first electrical signal, based on the reflected light; a plurality of spectrum pixels each configured to generate a second electrical signal, based on different narrow band light of the reflected light; and a sensor driver configured to generate the fingerprint image information based on the first electrical signal from each of the plurality of fingerprint pixels, and generate the fingerprint spectrum information based on the second electrical signal from each of the plurality of spectrum pixels.

According to an aspect of an example embodiment, a method of operating an electronic device including an optics-based fingerprint sensor may include sensing a touch from a user; allowing at least a part of a plurality of display pixels included in a display panel to emit light, in response to the sensed touch; obtaining fingerprint image information based on light reflected from a user fingerprint after being emitted from the at least a part of the plurality of display pixels; obtaining fingerprint spectrum information based on a plurality of narrow band light of the reflected light; performing a fingerprint matching operation of comparing the obtained fingerprint image information and preset fingerprint image information; performing a liveness detection operation of comparing the obtained fingerprint spectrum information and preset fingerprint spectrum information; determining whether a user authentication is successful, based on results of the fingerprint matching operation and the liveness detection operation, and performing a corresponding operation depending on a result of the determining.

BRIEF DESCRIPTION OF THE DRAWINGS

The above and other objects and features of the present disclosure will become apparent by describing in detail example embodiments thereof with reference to the accompanying drawings In which.

DETAILED DESCRIPTION

Figure 1:
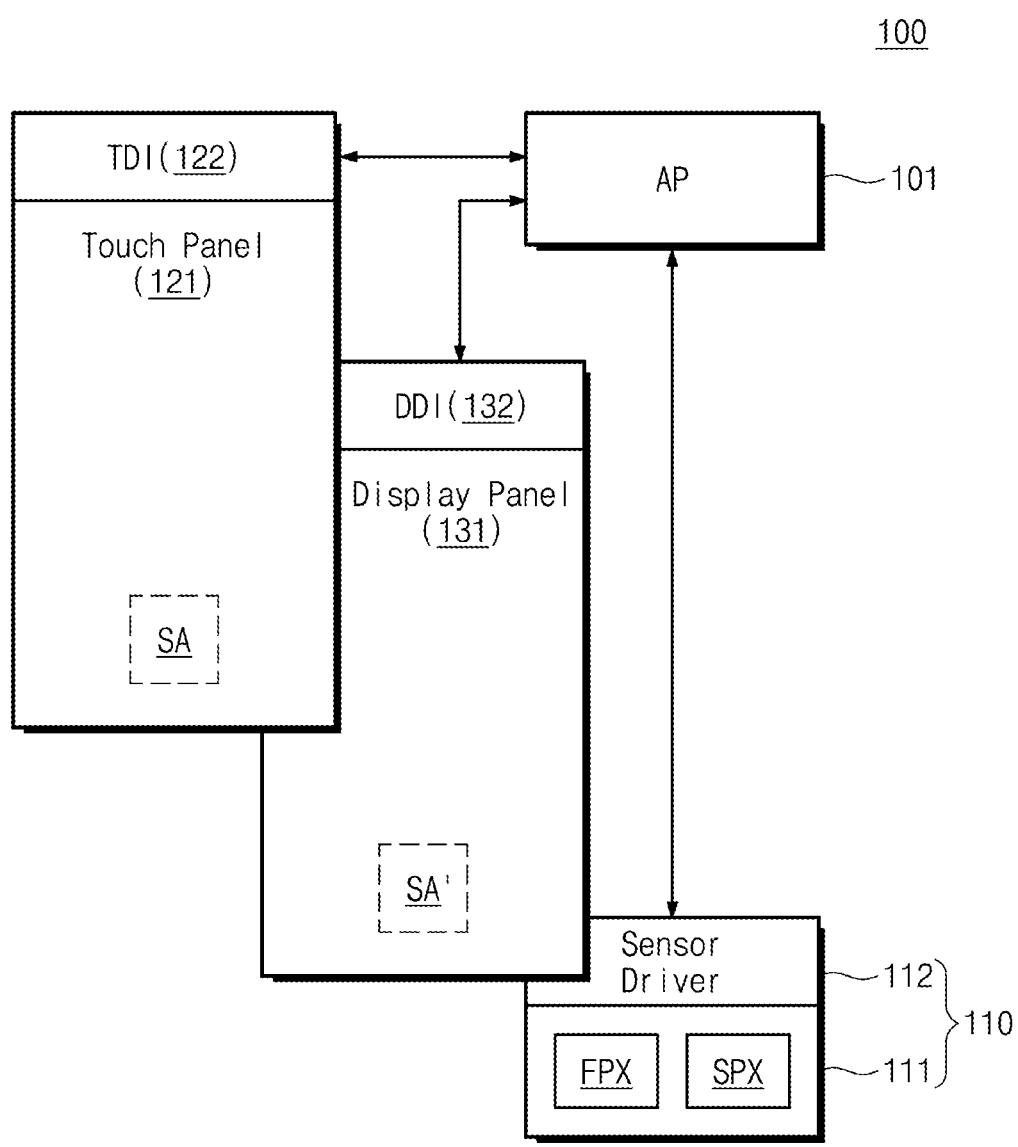
FIG. 1 is a block diagram illustrating an electronic device according to an example embodiment.

Reference will now be made in detail to example embodiments, with reference to the accompanying drawings. In the drawings, parts irrelevant to the description are omitted to clearly describe the example embodiments, and like reference numerals refer to like elements throughout the specification. In this regard, the present example embodiments may have different forms and should not be construed as being limited to the descriptions set forth herein.

FIG. 1 is a block diagram illustrating an electronic device according to an example embodiment. Referring to FIG. 1, an electronic device 100 may include a fingerprint sensor 110, a touch panel 121, a touch driving integrated circuit (TDI) 122, a display panel 131, a display driving integrated circuit (DDI) 132, and an application processor (AP) 101. In an example embodiment, the electronic device 100 may be one of various electronic devices such as a portable communication terminal, a smartphone, a personal digital assistant (PDA), a portable media player (PMP), a digital camera, a smartphone, a tablet computer, a laptop computer, a wearable device, and the like.

The fingerprint sensor 110 may be configured to sense or detect a fingerprint of a user. That is, the fingerprint sensor 110 may be a fingerprint detection sensor or a fingerprint recognition sensor that detects a user fingerprint for the purpose of authenticating a specific user or providing a specific authority to the specific user. In an example embodiment, the fingerprint sensor 110 may be an optics-based fingerprint detecting sensor. However, the scope and spirit of the present disclosure is not limited thereto.

The fingerprint sensor 110 may include a fingerprint sensing pixel array 111 and a sensor driver 112. The fingerprint sensing pixel array 111 may include a plurality of optical pixels. Each of the plurality of optical pixels may be configured to detect the intensity of light from the outside. In an example embodiment, the plurality of optical pixels of the fingerprint sensing pixel array 111 may be divided into a plurality of fingerprint pixels FPX and a plurality of spectrum pixels SPX. That is, the fingerprint sensing pixel array 111 may include the plurality of fingerprint pixels FPX and the plurality of spectrum pixels SPX.

Each of the plurality of fingerprint pixels FPX may be configured to sense light reflected from a user fingerprint. That is, the plurality of fingerprint pixels FPX may be configured to capture an image (i.e., fingerprint image information) of the user fingerprint.

Each of the plurality of spectrum pixels SPX may be configured to sense the intensity of light, which is associated with a specific wavelength or a narrow band wavelength (hereinafter referred to as "narrow band light"), of the light reflected from the user fingerprint. For example, a first spectrum pixel of the plurality of spectrum pixels SPX may detect the intensity of first narrow band light of a first wavelength, and a second spectrum pixel thereof may detect the intensity of second narrow band light of a second wavelength different from the first wavelength.

In an example embodiment, each of the plurality of fingerprint pixels FPX may be configured to detect light of a specific band (e.g., a first band). In contrast, each of the plurality of spectrum pixels SPX may detect narrow band light of bands that are narrower than the first band. In detail, a first fingerprint pixel of the plurality of fingerprint pixels FPX may be configured to detect light of a visible ray range (i.e., visible spectrum). In contrast, the first spectrum pixel of the plurality of spectrum pixels SPX may be configured to detect narrow band light of a wavelength (e.g., a wavelength of about 550 nm) of a narrow band. The second spectrum pixel of the plurality of spectrum pixels SPX may be configured to detect light of any other wavelength (e.g., a wavelength of about 560 nm). That is, fingerprint spectrum information about a specific wavelength band (e.g., 500 nm to 650 nm) may be obtained by the plurality of spectrum pixels SPX.

In other words, information detected by the plurality of fingerprint pixels FPX may indicate the intensity of light in the entire specific wavelength band, while fingerprint spectrum information detected by the plurality of spectrum pixels SPX may indicate the intensity of light for each wavelength.

In an example embodiment, the plurality of spectrum pixels SPX may respectively include nano-optical filters having different optical characteristics, for the purpose of detecting light of different narrow band wavelengths. A fingerprint pixels FPX and a spectrum pixels SPX will be more fully described with reference to the following drawings.

In an example embodiment, the information (i.e., the fingerprint image information) detected by the plurality of fingerprint pixels FPX may be used in a fingerprint matching operation for user authentication, and the information (i.e., the fingerprint spectrum information) detected by the plurality of spectrum pixels SPX may be used in a liveness detection operation for user authentication (in particular, fake fingerprint detection).

As described above, the fingerprint sensor 110 may determine whether a detected fingerprint is a fingerprint obtained from a finger of a real person, through the liveness detection operation, in addition to the fingerprint matching operation for a user fingerprint. In other words, whether a user fingerprint is forged may be determined through the liveness detection operation.

The sensor driver 112 may be configured to control the fingerprint sensing pixel array 111 under the control of the AP 101. For example, the sensor driver 112 may control the fingerprint sensing pixel array 111 such that fingerprint image information is obtained from the plurality of fingerprint pixels FPX of the fingerprint sensing pixel array 111 and fingerprint spectrum information FSI is obtained from the plurality of spectrum pixels SPX.

The touch panel 121 may include a plurality of sensing lines. The plurality of sensing lines may be arranged in a row direction and a column direction. Each of the plurality of sensing lines of the touch panel 121 may sense a user touch under the control of the TDI 122 and may provide the sensed signal to the TDI 122.

The TDI 122 may control the touch panel 121 and sense a touch of a user, based on a signal from the touch panel 121. For example, the TDI 122 may provide a sensing signal to a plurality of sensing lines and sense a touch of the user or a touch location or a touch area on the touch panel 121, based on a change of a signal received from the touch panel 121.

The touch panel 121 and the TDI 122 described above are an example, and the scope and spirit of the present disclosure is not limited thereto. The touch panel 121 and the TDI 122 may be implemented depending on various manners such as a mutual capacitance manner, a self-capacitance manner, and the like.

The display panel 131 may include a plurality of pixels for displaying image information to the outside. Each of the plurality of pixels may be an organic light-emitting diode (OLED) pixel, but the scope and spirit of the present disclosure is not limited thereto. Under the control of the DDI 132, the display panel 131 may display image information or allow pixels of a specific area to emit light.

According to an example embodiment illustrated in FIG. 1, the touch panel 121 and the display panel 131 are separated from each other, but the scope and spirit of the present disclosure is not limited thereto. For example, the display panel 131 may be formed on one semiconductor substrate, and the touch panel 121 may be formed on the display panel 131. Alternatively, the display panel 131 and the touch panel 121 may be formed in the same process. For example, the display panel 131 and the touch panel 121 may be implemented as an on-cell type or an in-cell type.

According to an example embodiment illustrated in FIG. 1, the TDI 122 and the DDI 132 are separated from each other, but the scope and spirit of the present disclosure is not limited thereto. The TDI 122 and the DDI 132 may be implemented with one semiconductor chip or one semiconductor module.

The AP 101 may control overall operations of the electronic device 100. The AP 101 may control the sensor driver 112, the TDI 122, and the DDI 132 depending on an operation mode of the electronic device 100, an input of the user, or various maintenance operations.

In an example embodiment, the touch panel 121 and the display panel 131 may include fingerprint sensing areas SA and SA', respectively. The fingerprint sensing areas SA and SA' may correspond to an area where a user fingerprint is touched, for the purpose of sensing or detecting the user fingerprint.

The sensing areas SA and SA' of the panels 121 and 131 and the fingerprint sensor 110 may be placed to overlap each other. For example, the sensing area SA' of the display panel 131 may be placed under the sensing area SA of the touch panel 121, and the fingerprint sensor 110 (or the fingerprint sensing pixel array 111) may be placed under the sensing area SA' of the display panel 131.

When a touch of the user is detected, the AP 101 may control the DDI 132 to allow the sensing area SA' of the display panel 131 (or some pixels of the sensing area SA') to emit light. The DDI 132 may allow some pixels of the sensing area SA' of the display panel 131 to emit light under the control of the AP 101.

Afterwards, when the user fingerprint approaches or contacts the sensing area SA of the touch panel 121, the AP 101 may control the DDI 132 to allow all or some pixels of the sensing area SA' of the display panel 131 to emit light. In this case, the amount of light emitted by the pixels may be greater than before a fingerprint touch. Alternatively, the amount of light emitted by the pixels may be greater than the amount of light set in advance by the user. Alternatively, the amount of light emitted by the pixels may be a maximum value.

The light emitted from all or some pixels of the sensing area SA' of the display panel 131 may be reflected by the user fingerprint, and the reflected light may be provided to the fingerprint sensor 110. The fingerprint sensor 110 may capture light reflected from the user fingerprint to obtain user fingerprint image information and fingerprint spectrum information. In an example embodiment, the user fingerprint image information may be obtained by the plurality of fingerprint pixels FPX, and the fingerprint spectrum information may be obtained through the plurality of spectrum pixels SPX. That is, display pixels emitting light may be used as a light source for detecting the fingerprint image information and the fingerprint spectrum information.

The AP 101 may perform a fingerprint matching operation, based on the obtained fingerprint image information and may determine whether the obtained fingerprint image information is an authenticated fingerprint, based on the result of the fingerprint matching operation; the AP 101 may perform the liveness detection operation, based on the fingerprint spectrum information and may determine whether a fingerprint being in contact with the sensing area SA of the touch panel 121 is a fingerprint of a real person based on the result of the liveness detection operation.

Figure 2:
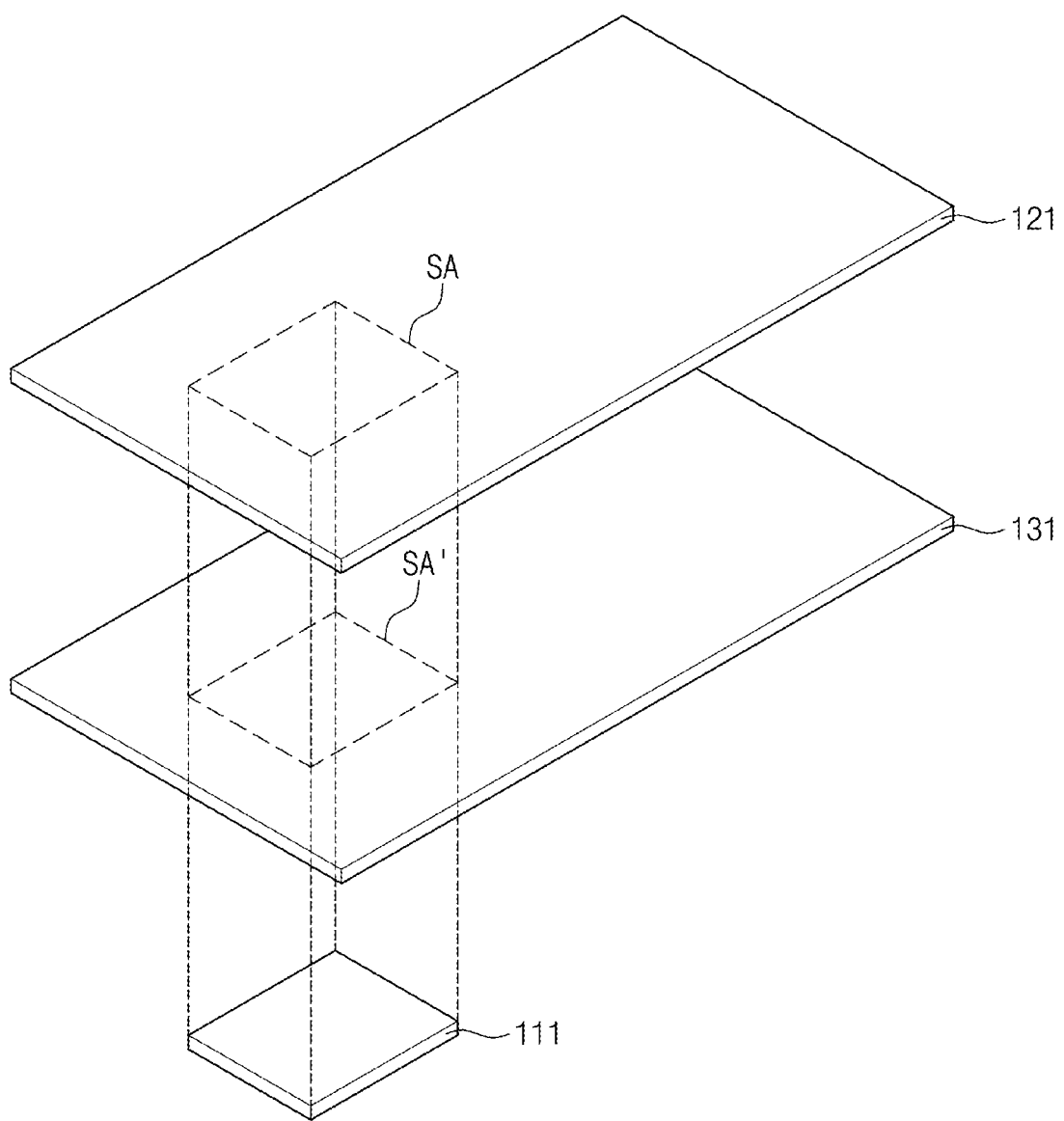
FIG. 2 is a view illustrating a configuration of a fingerprint sensing pixel array, a touch panel, and a display panel of FIG. 1.

FIG. 2 is a view illustrating a configuration of the fingerprint sensing pixel array 111, the touch panel 121, and the display panel 131 of FIG. 1. For ease of illustration and for convenience of description, the remaining components other than the fingerprint sensing pixel array 111, the touch panel 121, and the display panel 131 are omitted. However, the scope and spirit of the present disclosure is not limited thereto.

Referring to FIGS. 1 and 2, the electronic device 100 may include the fingerprint sensing pixel array 111, the touch panel 121, and the display panel 131. As illustrated in FIG. 2, the display panel 131 may be placed under the touch panel 121, and the fingerprint sensing pixel array 111 may be placed under the display panel 131.

In detail, the touch panel 121 and the display panel 131 may be disposed in such a way that the sensing area SA of the touch panel 121 is aligned with the sensing area SA' of the display panel 131. The fingerprint sensing pixel array 111 and the display panel 131 may be disposed in such a way that the sensing area SA' of the display panel 131 and the fingerprint sensing pixel array 111 are aligned.

Since the fingerprint sensing pixel array 111, the touch panel 121, and the display panel 131 are disposed as shown in FIG. 2, when a user fingerprint is in contact with the sensing area SA of the touch panel 121, light emitted from display pixels included in the sensing area SA' of the display panel 131 may be reflected by a fingerprint, and the reflected light may be provided to the fingerprint sensing pixel array 111. Accordingly, the fingerprint sensor 110 may obtain fingerprint image information and fingerprint spectrum information of the user fingerprint.

Figure 3:
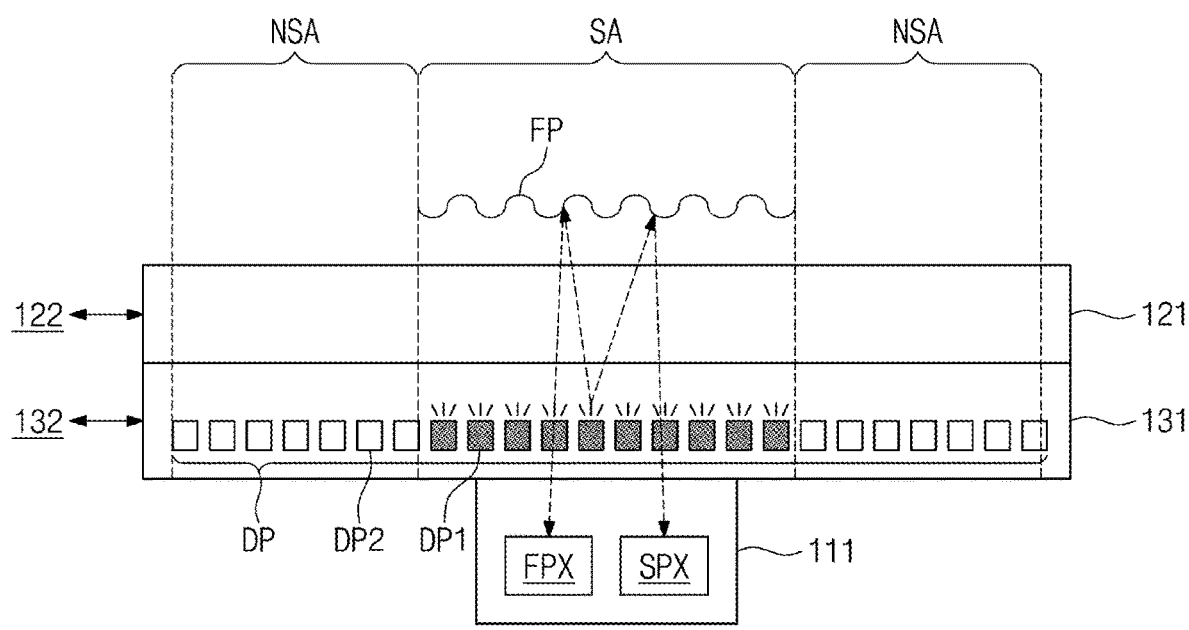
FIG. 3 is a view illustrating an operation of the fingerprint sensing pixel array, the touch panel, and the display panel of FIG. 1.

FIG. 3 is a view illustrating an operation of the fingerprint sensing pixel array 111, the touch panel 121, and the display panel 131 of FIG. 1. For ease of illustration and for convenience of description, the remaining components other than the fingerprint sensing pixel array 111, the touch panel 121, and the display panel 131 are omitted. However, the scope and spirit of the present disclosure is not limited thereto.

Referring to FIGS. 1 and 3, the electronic device 100 may include the fingerprint sensing pixel array 111, the touch panel 121, and the display panel 131. As described above, the fingerprint sensing pixel array 111, the touch panel 121, and the display panel 131 may be disposed to overlap each other.

The display panel 131 may include a plurality of display pixels DP. The plurality of display pixels DP may emit light under the control of the DDI 132. For example, the plurality of display pixels DP may be OLED pixels, but the scope and spirit of the present disclosure is not limited thereto.

First display pixels DP1 of the plurality of display pixels may indicate all or some of display pixels included in the sensing area SA. For example, the first display pixels DP1 may correspond to display pixels included in the sensing area SA. Alternatively, the first display pixels DP1 may be display pixels placed on/over the fingerprint sensing pixel array 111. Alternatively, the first display pixels DP1 may be display pixels included in an area of a touch panel, with which a fingerprint FP is in contact.

Second display pixels DP2 of the plurality of display pixels may not emit light. For example, the second display pixels DP2 may indicate those display pixels that are included in a non-sensing area NSA (e.g., areas of the touch panel 121 and the display panel 131 that are not included in the sensing area SA). Alternatively, the second display pixels DP2 may be display pixels included in an area of the touch panel 121 where a fingerprint FP is not in contact.

For example, when the user fingerprint FP is in contact with or approaches the sensing area SA of the touch panel 121, some display pixels (e.g., the first display pixels DP1) of the display pixels of the display panel 131 may emit light under the control of the DDI 132. For example, the DDI 132 may allow the first display pixels DP1 to emit light such that light emitted from the first display pixels DP1 is reflected by the fingerprint FP and the reflected light is provided to the fingerprint sensing pixel array 111 of the fingerprint sensor 110. In this case, the first display pixels DP1 may emit light, the amount of which is greater than a reference value set in advance by the user. Alternatively, the first display pixels DP1 may emit light maximally. Light emitted from the first display pixels DP1 may be reflected by the fingerprint FP, and the reflected light may be provided to the fingerprint sensing pixel array 111.

The fingerprint sensing pixel array 111 may include the plurality of fingerprint pixels FPX and the plurality of spectrum pixels SPX. The plurality of fingerprint pixels FPX and the plurality of spectrum pixels SPX may obtain fingerprint image information and fingerprint spectrum information, respectively, based on the light that is emitted from the first display pixels DP1 and reflected from the fingerprint FP. For example, the plurality of fingerprint pixels FPX may obtain the fingerprint image information based on the light reflected from the fingerprint FP, and the plurality of spectrum pixels SPX may obtain the fingerprint spectrum information based on the light reflected from the fingerprint FP.

In an example embodiment, the obtained fingerprint image information may be used for the fingerprint matching operation, and the obtained fingerprint spectrum information may be used for the liveness detection operation.

In an example embodiment, some pixels of the first display pixels DP1 may emit light more brightly than the remaining pixels. In this case, the location of these pixels may correspond to the location of the spectrum pixels SPX. That is, display pixels, which correspond to the spectrum pixels SPX, from among the first display pixels DP1 may emit light more brightly than the remaining display pixels.

Figure 4:
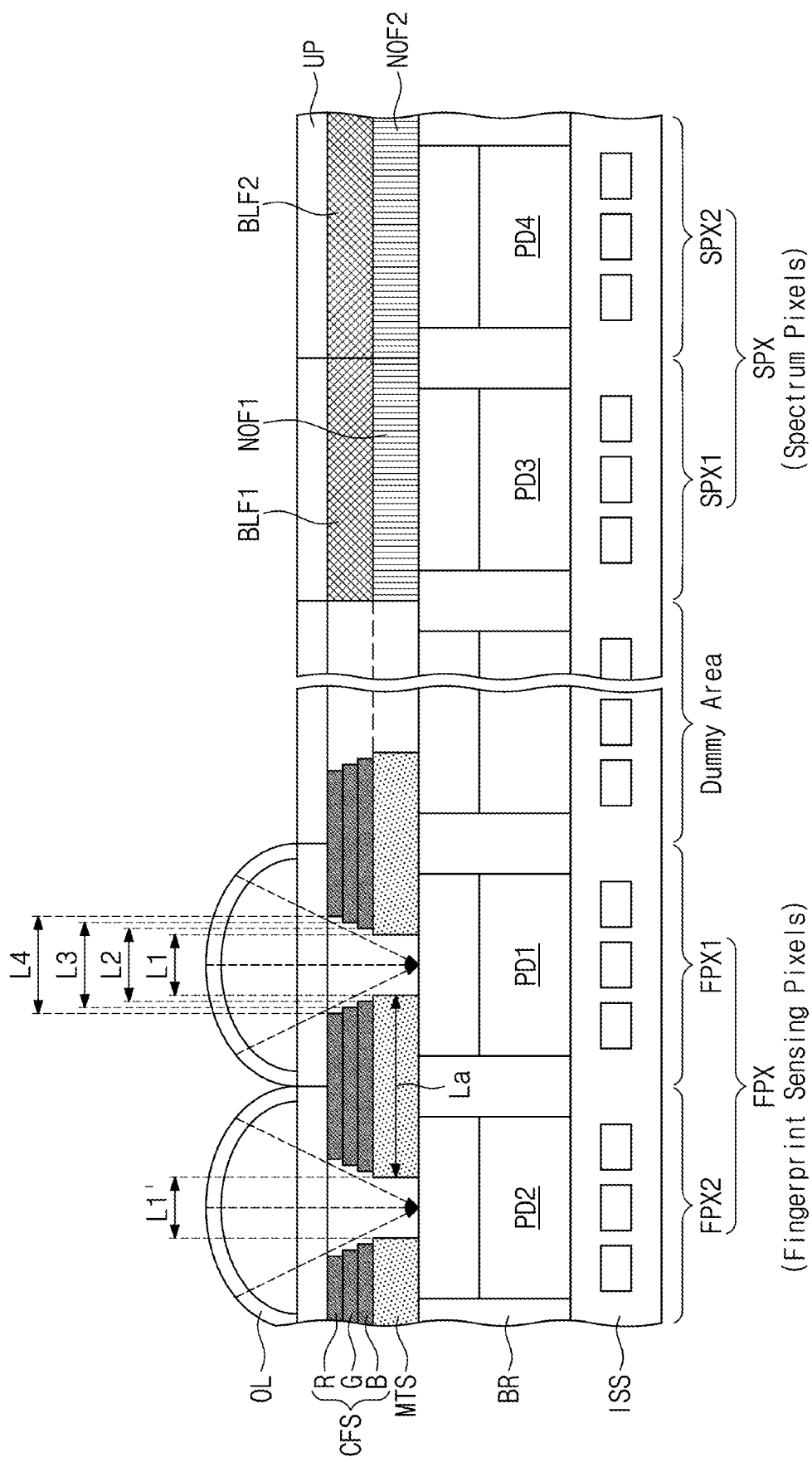
FIG. 4 is a view illustrating a structure of a fingerprint pixel and a spectrum pixel of FIG. 1.

FIG. 4 is a view illustrating a structure of a fingerprint pixel FPX and a spectrum pixel SPX of FIG. 1. The fingerprint pixels FPX and the spectrum pixels SPX illustrated in FIG. 4 are examples, and the scope and spirit of the present disclosure is not limited thereto.

Below, for convenience of description, the terms "wide band light" and "narrow band light" are used. The wide band light indicates light having a wavelength of a specific band which is reflected from a user fingerprint. The narrow band light indicates light having a specific wavelength. For example, the wide band light may indicate light having a wavelength included in a band from 500 nm to 650 nm and may be light filtered by a band limit filter. The narrow band light may be light having a wavelength of 550 nm±α (where α is a non-negative integer and a disclosed numerical value is an example) and may be light filtered by a nano-optical filter. In an example embodiment, the wavelength of the narrow band light may be determined by an optical characteristic of the nano-optical filter. However, the terms are to describe the technical idea of the present disclosure easily, and the scope and spirit of the present disclosure is not limited thereto.

Referring to FIG. 4, the fingerprint sensing pixel array 111 may include the fingerprint pixels FPX1 and FPX2 and the spectrum pixels SPX1 and SPX2. Each of the fingerprint pixels FPX1 and FPX2 may include an optical lens OL, an upper passivation layer UP, a metal shield structure MTS, a color filter structure CFS, photodiodes PD1 and PD2, and boundary isolation layers BR. The optical lens OL is configured to focus light reflected from the fingerprint FP. The upper passivation layer UP may be formed between the optical lens OL and the color filter structure CFS.

Below, for convenience of description, an example embodiment of the present disclosure is described in reference to the first fingerprint pixel FPX1, but, the scope and spirit of the present disclosure is not limited thereto. The second fingerprint sensing pixel FPX2 may be the same with the first fingerprint sensing pixel FPX1.

The metal shield structure MTS may prevent the reflected light from being provided to the photodiode PD1. That is, the metal shield structure MTS may block the reflected light in the remaining portion other than a first opening L1 to allow only a vertical component of the reflected light to arrive at the photodiode PD1. The reason is that there is a need to block surrounding non-vertical light for the purpose of clearly recognizing a target of a small size, such as ridge and valley of a fingerprint, in object sensing such as fingerprint sensing.

In an example embodiment, a diameter (or length) of the first opening L1 may be shorter than a distance between the first opening L1 and another opening adjacent to the first opening L1. For example, an opening L1' of the second fingerprint sensing pixel FPX2 may be adjacent to the first opening L1, and the diameter (or length) of the first opening L1 may be shorter than the distance between the first opening L1 and the opening L1'. In an example embodiment, metal material forming the metal shield structure MTS may be filled between the first opening L1 and the opening L1'. Thus, the diameter of the first opening L1 may be shorter than a length La of the metal material formed between the first opening L1 and the adjacent opening L1'.

In an example embodiment, the metal shield structure MTS may be partitioned into a plurality of sub shield structures. Each of the plurality of sub shield structures may be apart from each other by a length of the first opening L1. Each of the plurality of sub structures may be formed on the first and second finger print sensing pixels FPX1 and FPX2 (or, photodiodes PD1 and PD2 thereof). Alternatively, each of the plurality of sub structures may be partially overlapped with the first and second finger print sensing pixels FPX1 and FPX2 (or, photodiodes PD1 and PD2 thereof). For example, a first sub shield structure may be metal material filled between the first opening L1 and the opening L1'. The first sub shield structure may be overlapped partially with two photodiodes PD1 and PD2 as illustrated in FIG. 4. A length La of the first sub shield structure may be longer than a diameter of the first opening L1 (or a distance between the first sub shield structure and an adjacent sub shield structure).

In an example embodiment, the metal shield structure MTS may include metal. The metal shield structure MTS may include, but is not limited to, at least one of tungsten (W), aluminum (Al), and copper (Cu).

The color filter structure CFS may include a plurality of color filters (e.g., red (R), green (G), and blue (B)) stacked on the metal shield structure MTS. For example, a blue filter "B" of the color filter structure CFS may be stacked on the metal shield structure MTS, a green filter "G" may be stacked on the blue filter "B", and a red filter "R" may be stacked on the green filter "G".

The filters "R," "G," and "B" of the color filter structure CFS may include second to fourth openings L2 to L4, respectively. Each of the second to fourth openings L2 to L4 may be configured to pass the light focused by the optical lens OL. In an example embodiment, diameters of the second to fourth openings L2 to L4 may be different from each other. In other words, as illustrated in FIG. 4, the second to fourth openings L2 to L4 of the filters "R", "G", and "B" may be formed in a stair shape (e.g., a cascade). In an example embodiment, the plurality of color filters "R", "G", and "B" of the color filter structure CFS may be formed so as not to cover the first opening L1 of the metal shield structure MTS. That is, the second to fourth openings L2 to L4 of the filters "R", "G", and "B" may be formed to expose the first opening L1 of the metal shield structure MTS as illustrated in FIG. 4.

The color filters "R," "G," and "B" of the color filter structure CFS may be formed in the remaining area other than an area where the openings L2 to L4 are formed. That is, the color filter structure CFS may be formed to be connected in the fingerprint pixels FPX.

The color filter structure CFS may implement the black exterior of the fingerprint sensing pixel array 111. For example, the metal shield structure MTS may block light reflected from a fingerprint and may simultaneously reflect a portion of the reflected light. When the reflected light is exposed or reflected to the outside by the metal shield structure MTS, a location of an image sensor may be identified by the user. That is, an image sensor, the color of which varies to various colors depending on an angle of reflection on the outside, may be identified with the naked eye by the user.

To prevent this phenomenon, the black exterior of the color filter structure CFS may be implemented as the color filter structure CFS absorbs various wavelength bands of the reflected light. For example, the red filter "R" of the color filter structure CFS may pass only light, which has a wavelength corresponding to a red component, from among the reflected light and may block or absorb light of the remaining wavelengths. In contrast, the green filter "G" and the blue filter "B" of the color filter structure CFS may pass only light, which has wavelengths respectively corresponding to green and blue components, from among the reflected light and may block or absorb light of the remaining wavelengths. That is, since most of the wavelength range is absorbed by the color filter structure CFS where the red filter "R," the green filter "G," and the blue filter "B" are stacked, the fingerprint sensing pixel array 111 may appear black from the outside.

The color filter structure CFS may include, but is not limited to, an organic component such as photo resist (PR). In an example embodiment, a stack method, a stack order, or a configuration of color filters of the color filter structure CFS may be variously changed or modified.

The boundary isolation layer BR may be formed under the metal shield structure MTS. The boundary isolation layer BR may be configured to individually separate the plurality of fingerprint pixels FPX and the plurality of spectrum pixels SPX of the fingerprint sensing pixel array 111. That is, the plurality of fingerprint pixels FPX and the plurality of spectrum pixels SPX may be individually separated by the boundary isolation layer BR. In an example embodiment, the boundary isolation layer BR may be formed in a substrate or on the substrate.

The photodiode PD1 may be formed between the boundary isolation layer BR. The photodiode PD1 may be configured to output an electrical signal depending on the intensity of incident light. In an example embodiment, the structure of the boundary isolation layer BR and the photodiode PD1 is not limited to FIG. 4, and may be variously changed or modified depending on the structure of the fingerprint pixels FPX and the spectrum pixels SPX.

In an example embodiment, an insulation structure ISS may be provided under the photodiode PD. The insulation structure ISS may include various interconnections or various elements connected with the fingerprint pixels FPX and the spectrum pixels SPX.

The spectrum pixels SPX may be formed on the same substrate as the fingerprint pixels FPX. The spectrum pixels SPX may be formed to be spaced apart from the fingerprint pixels FPX by a predetermined distance. In other words, a dummy area may exist between the spectrum pixels SPX and the fingerprint pixels FPX. The dummy area may include a structure that is partially similar to the fingerprint pixels FPX or may be filled in a specific structure.

In an example embodiment, a length of the dummy area may be longer than a distance between the first fingerprint sensing pixel FPX1 and the second fingerprint sensing pixel FPX2. For example, the first and second fingerprint sensing pixels FPX1 and FPX2 may be adjacent to each other. The first fingerprint sensing pixel FPX1 and the first spectrum pixel SPX1 may be apart from each other by a predetermined distance (i.e., a length of the dummy area). In other words, a distance between the first fingerprint sensing pixel FPX1 and the second finger print pixel FPX2 adjacent to the first fingerprint sensing pixel FPX1 may be shorter than a distance between the first fingerprint pixel FPX1 and the first spectrum pixel SPX1 adjacent to the first fingerprint pixel FPX1.

In an example embodiment, a distance between photodiodes of the fingerprint sensing pixels FPX may be shorter than a distance between a photodiode of the fingerprint sensing pixel FPX and a photodiode of the spectrum pixel adjacent to the fingerprint pixel SPX. For example, a first photodiode PD1 of the first fingerprint sensing pixel FPX1 may be apart from a second photodiode PD2 of the second fingerprint sensing pixel FPX2 adjacent to the first fingerprint sensing pixel FPX1 by a length of the boundary isolation layers BR, but, the first photodiode PD1 of the first fingerprint sensing pixel FPX1 may be apart from a third photodiode PD3 of the first spectrum pixel SPX1 adjacent to the first fingerprint sensing pixel FPX1 by a length of the dummy area. Here, the length of the boundary isolation layers BR may be shorter than the length of the dummy area.

The spectrum pixels SPX may include band limit filters BLF1 and BLF2, nano-optical filters NOF1 and NOF2, and photodiodes PD3 and PD4, respectively.

The band limit filters BLF1 and BLF2 may be formed in the same layer as the color filter structure CFS. For example, each of the band limit filters BLF1 and BLF2 may be an optical filter configured to pass a specific band of wide band light. In an example embodiment, each of the band limit filters BLF1 and BLF2 may be a color filter (e.g., a green filter) configured to pass wide band light of about 500 nm to 650 nm. However, the scope and spirit of the present disclosure is not limited thereto. Also, each of the band limit filters BLF1 and BLF2 of the spectrum pixels SPX may be an optical filter configured to pass wide band light of different wavelength bands.

Although not illustrated clearly in FIG. 4, the band limit filters BLF1 and BLF2 may be formed in the same layer of one or more color filters of the color filters "R," "G," and "B" of the color filter structure CFS.

The nano-optical filters NOF1 and NOF2 may be formed in the same layer as the metal shield structure MTS. A height of the nano-optical filters NOF1 and NOF2 may be the same with that of the metal shield structure MTS. The nano-optical filters NOF1 and NOF2 may have an optical characteristic of passing narrow band light having a specific wavelength. For example, the nano-optical filters NOF1 and NOF2 may be implemented in the form of a hole or a disc.

For example, in the case where the nano-optical filters NOF1 and NOF2 are formed in a hole shape, the nano-optical filters NOF1 and NOF2 may pass only first narrow band light having a first wavelength. In the case where the nano-optical filters NOF1 and NOF2 are formed in a disc shape, the nano-optical filter NOF1 and NOF2 may pass the remaining light other than the first narrow band light having the first wavelength.

For example, the nano-optical filters NOF1 and NOF2 may be formed to have different wavelength characteristics. For example, in the case where the first nano-optical filter NOF1 includes a hole having a first diameter, the first nano-optical filter NOF1 may pass the first narrow band light of the first wavelength. In contrast, in the case where the second nano-optical filter NOF2 includes a hole having a second diameter, the second nano-optical filter NOF2 may pass second narrow band light of a second wavelength. Each of the photodiodes PD of the spectrum pixels SPX may generate an electrical signal corresponding to the intensity of narrow band light filtered by a nano-optical filter NOF.

In an example embodiment, the photodiodes PD3 and PD4 of the spectrum pixels SPX may be have the same structure with the photodiodes PD1 and PD2 of the fingerprint sensing pixels FPX. For example, a height of the photodiodes PD3 and PD4 of the spectrum pixels SPX may be the same with that of the photodiodes PD1 and PD2 of the fingerprint sensing pixels FPX. Alternatively, a length of the photodiodes PD3 and PD4 of the spectrum pixels SPX may be the same with that of the photodiodes PD1 and PD2 of the fingerprint sensing pixels FPX.

In an example embodiment, unlike the fingerprint pixels FPX, the spectrum pixels SPX may not include the optical lens OL. Also, unlike the fingerprint pixels FPX, the spectrum pixels SPX may not include a separate opening. The reason is that there is a need to receive a lot of light since the spectrum pixels SPX detect only narrow band light of a specific wavelength, compared with the fingerprint pixels FPX. That is, the spectrum pixels SPX may receive the whole incident light through the area of the spectrum pixels SPX formed on a substrate, by excluding a separate light focusing element or an element for blocking light of a specific range.

As described above, the intensity of narrow band light of a specific wavelength or the remaining light other than the narrow band light of the specific wavelength may be detected by using the nano-optical filter NOF. According to the above description, information about the intensity of the narrow band light may be obtained by the spectrum pixels SPX.

Figure 5:
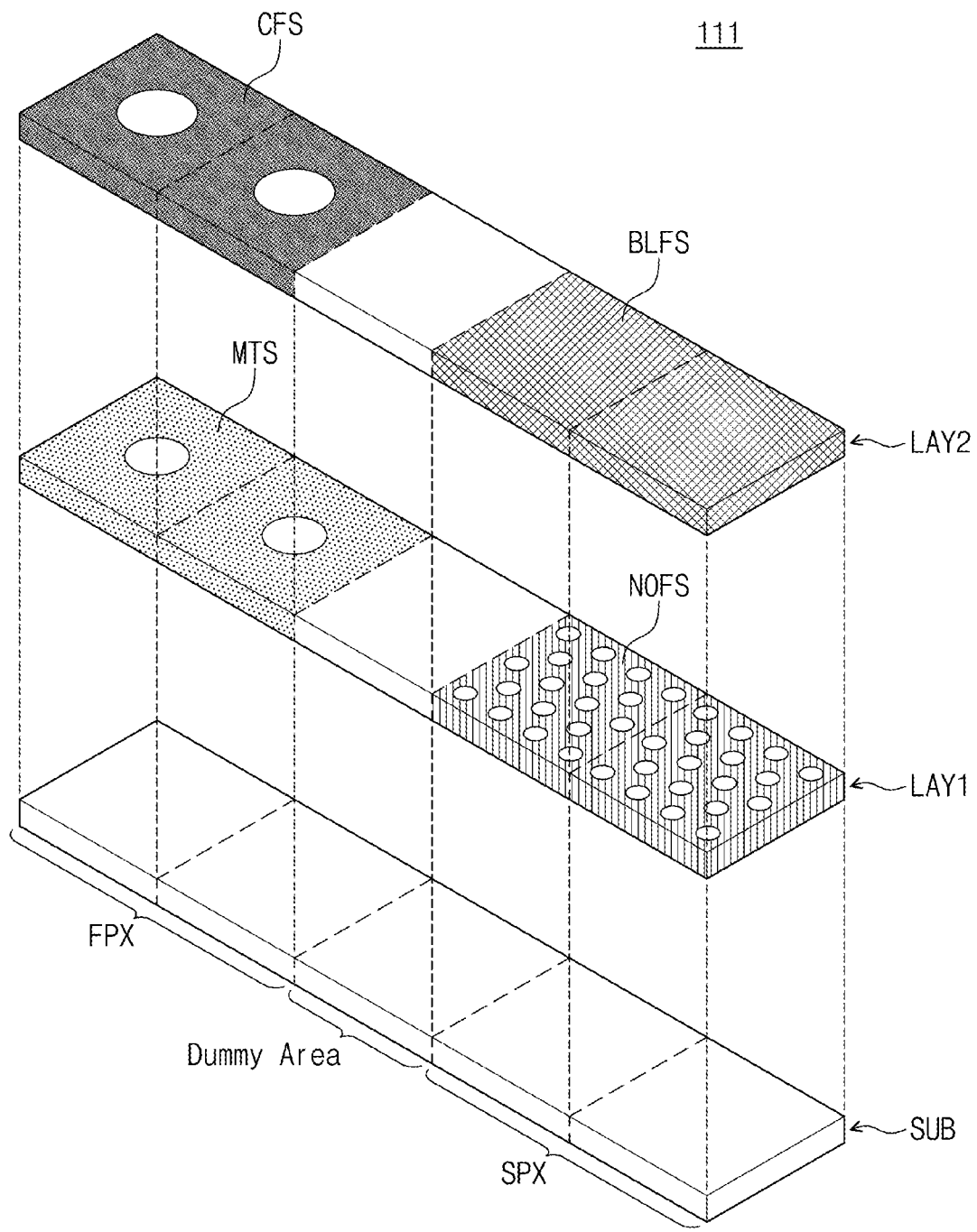
FIG. 5 is a perspective view illustrating a structure of fingerprint pixels and spectrum pixels of FIG. 4.

FIG. 5 is a perspective view illustrating a structure of the fingerprint pixels FPX and the spectrum pixels SPX of FIG. 4. For a brief description, components that are unnecessary to describe a structure of the fingerprint pixels FPX and the spectrum pixels SPX are omitted.

Referring to FIGS. 4 and 5, the fingerprint pixels FPX and the spectrum pixels SPX may be formed on a substrate SUB. For example, the photodiodes PD, the boundary isolation layers BR, and the insulation structure ISS described with reference to FIG. 4 may be formed in the substrate SUB or on the substrate SUB.

A first layer LAY1 may be formed on/over the substrate SUB. For example, the first layer LAY1 may include the metal shield structure MTS and a nano-optical filter structure NOFS. As described with reference to FIG. 4, the metal shield structure MTS may be formed on the fingerprint pixels FPX, and the nano-optical filter structure NOFS may be formed on the spectrum pixels SPX. The nano-optical filter structure NOFS may include the nano-optical filters NOF1 and NOF2 described with reference to FIG. 4.

A second layer LAY2 may be formed on/over the first layer LAY1. For example, the second layer LAY2 may include the color filter structure CFS and a band limit filter structure BLFS. The color filter structure CFS may be formed over the fingerprint pixels FPX, and the band limit filter structure BLFS may be formed over the spectrum pixels SPX. The band limit filter structure BLFS may include the band limit filters BLF1 and BLF2 described with reference to FIG. 4. In an example embodiment, the dummy area may exist between the fingerprint pixels FPX and the spectrum pixels SPX.

As described above, the fingerprint pixels FPX and the spectrum pixels SPX may be formed on the same substrate, and the metal shield structure MTS of the fingerprint pixels FPX and the nano-optical filter structure NOFS of the spectrum pixels SPX may be in the same layer (i.e., the first layer LAY1). Also, the color filter structure CFS of the fingerprint pixels FPX and the band limit filter structure BLFS of the spectrum pixels SPX may be formed in the same layer (i.e., the second layer LAY2). However, the scope and spirit of the present disclosure may not be limited thereto. For example, the arrangement or locations of respective structures may be variously changed or modified.

Figure 6A:
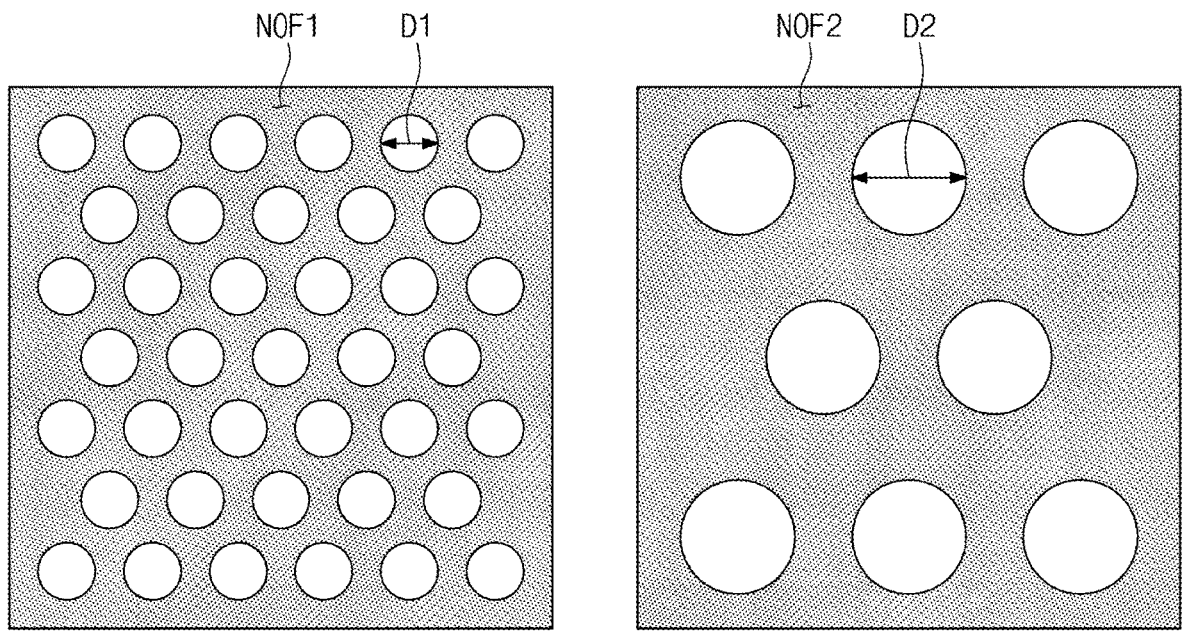
FIGS. 6A and 6B are views illustrating structures and optical characteristics of nano-optical filters.
Figure 6B:
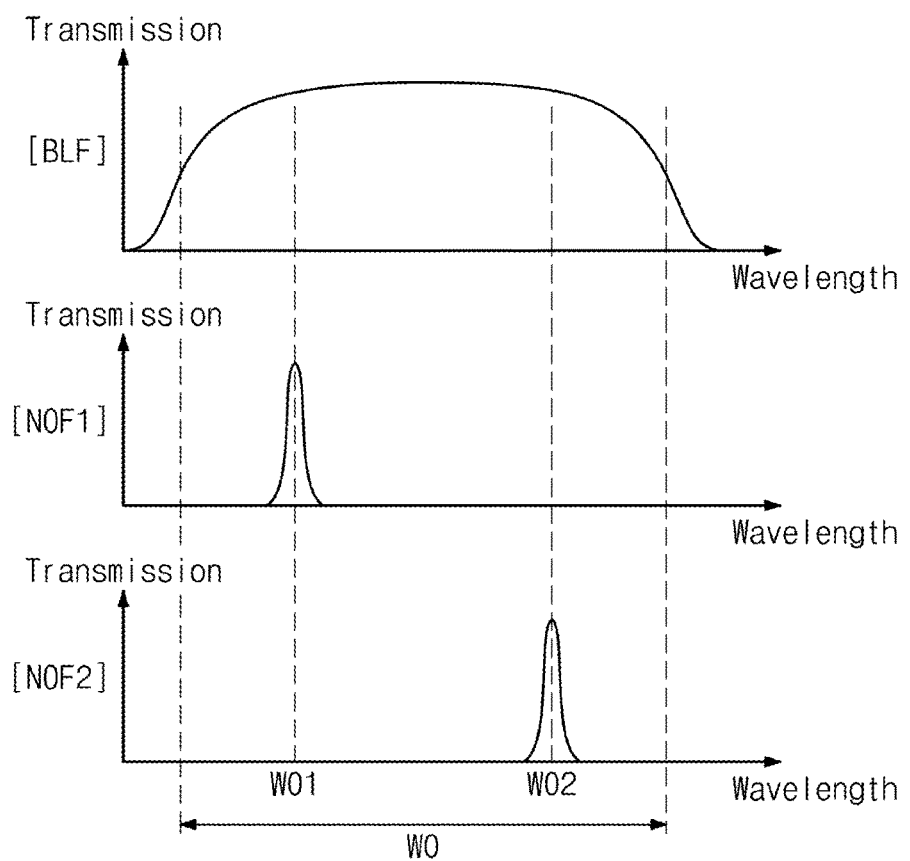

FIGS. 6A and 6B are views illustrating structures and optical characteristics of the nano-optical filters NOF1 and NOF2. For a brief description, an embodiment of the present disclosure will be described with reference to the first and second nano-optical filters NOF1 and NOF2. However, the scope and spirit of the present disclosure may not be limited thereto. For example, each of any other spectrum pixels SPX may include various shapes of nano-optical filters.

Referring to FIGS. 4, 6A, and 6B, each of the spectrum pixels SPX may include the first nano-optical filter NOF1 and the second nano-optical filter NOF2. As described above, the first and second nano-optical filters NOF1 and NOF2 may be configured to pass narrow band light of a specific wavelength.

For example, the first and second nano-optical filters NOF1 and NOF2 may be implemented in the form of a hole. The first nano-optical filter NOF1 may include a plurality of holes, each of which has a first diameter D1. The second nano-optical filter NOF2 may include a plurality of holes, each of which has a second diameter D2 greater than the first diameter D1.

The first and second nano-optical filters NOF1 and NOF2 may have different optical characteristics depending on hole diameters. For example, as illustrated in FIG. 6B, each of the band limit filters BLF1 and BLF2 may be an optical filter that passes wide band light of a 0-th wavelength band W0. The first nano-optical filter NOF1 may pass only narrow band light, which has a first wavelength W01, of filtered wide band light received from the band limit filter BLF1, and the second nano-optical filter NOF2 may pass only narrow band light, which has a second wavelength W02, of filtered wide band light received from the band limit filter BLF2. In this case, values of the first wavelength W01 and the second wavelength W02 may be determined according to diameters of the plurality of holes of the first and second nano-optical filters NOF1 and NOF2.

As described above, the plurality of spectrum pixels SPX may include the nano-optical filters NOF including a plurality of holes having different diameters and may be configured to detect light of different wavelengths depending on the optical characteristic of the nano-optical filters NOF.

Figure 7:
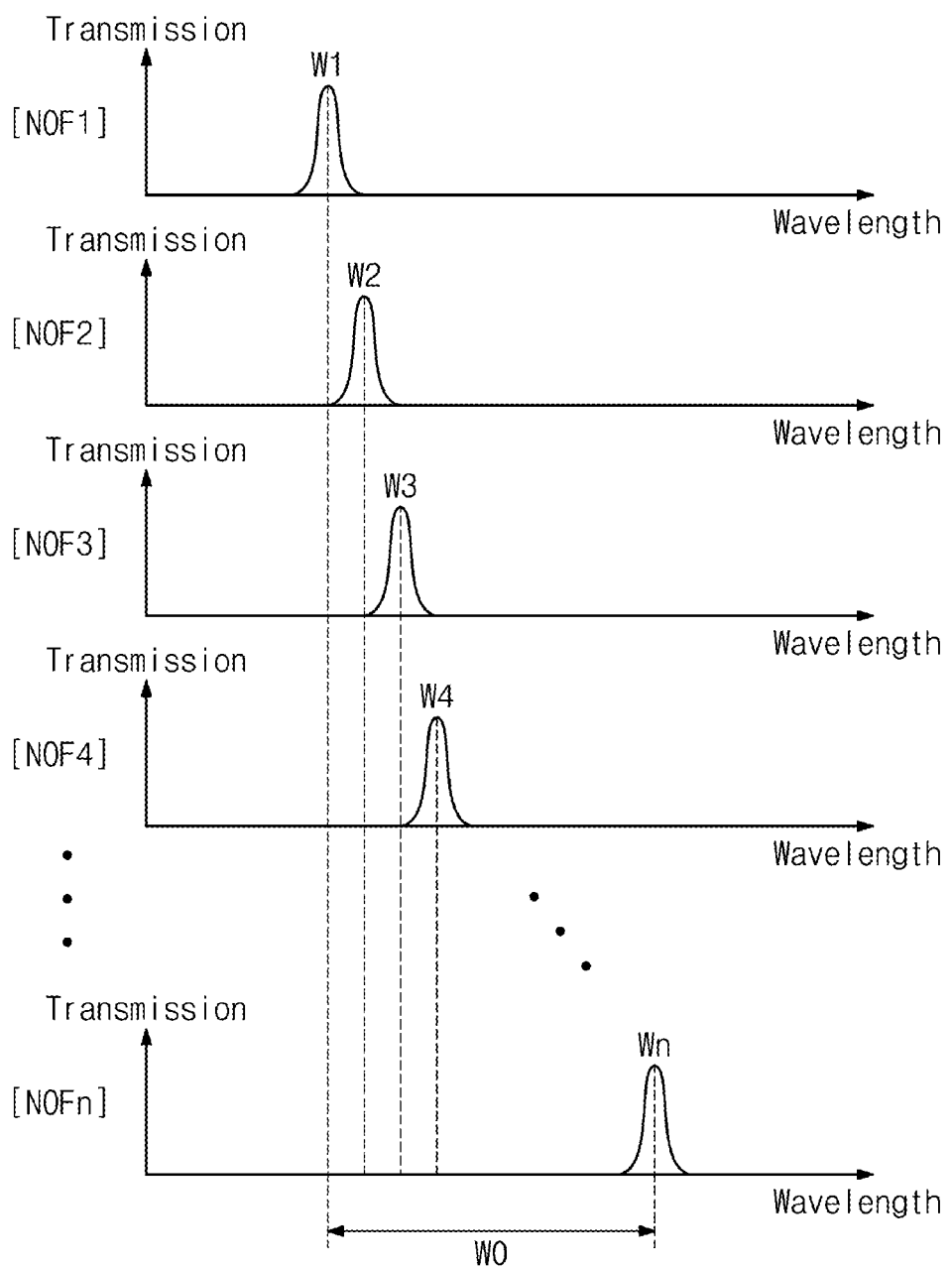
FIG. 7 illustrates graphs indicating optical characteristics of a plurality of nano-optical filters respectively included in the spectrum pixels.

FIG. 7 illustrates graphs indicating optical characteristics of a plurality of nano-optical filters NOF1 to NOFn included in each spectrum pixels SPX. Referring to FIG. 7, each of the plurality of spectrum pixels SPX may include a plurality of nano-optical filters NOF1 to NOFn having different optical characteristics. Each of the plurality of nano-optical filters NOF1 to NOFn may include holes having different diameters as described above.

In detail, a part of the plurality of spectrum pixels SPX may respectively include first nano-optical filters NOF1 each including a plurality of holes having a first diameter, another part of the plurality of spectrum pixels SPX may respectively include second nano-optical filters NOF2 each including a plurality of holes having a second diameter, and another part of the plurality of spectrum pixels SPX may respectively include third nano-optical filters NOF3 each including a plurality of holes having a third diameter.

The plurality of nano-optical filters NOF1 to NOFn may respectively have different optical characteristics depending on hole diameters. For example, as illustrated in FIG. 7, the first nano-optical filter NOF1 may be configured to pass only narrow band light having a first wavelength W1, the second nano-optical filter NOF2 may be configured to pass only narrow band light having a second wavelength W2, and the third nano-optical filter NOF3 may be configured to pass only narrow band light having a third wavelength W3. Likewise, the fourth to n-th nano-optical filters NOF4 to NOFn may be configured to pass only narrow band light having fourth to n-th wavelengths W4 to Wn, As described above, since the spectrum pixels SPX include nano-optical filters NOF1 to NOFn, respectively, spectrum information (i.e., fingerprint spectrum information) of the 0-th wavelength band W0 may be obtained based on information detected from the plurality of spectrum pixels SPX.

Figure 8:
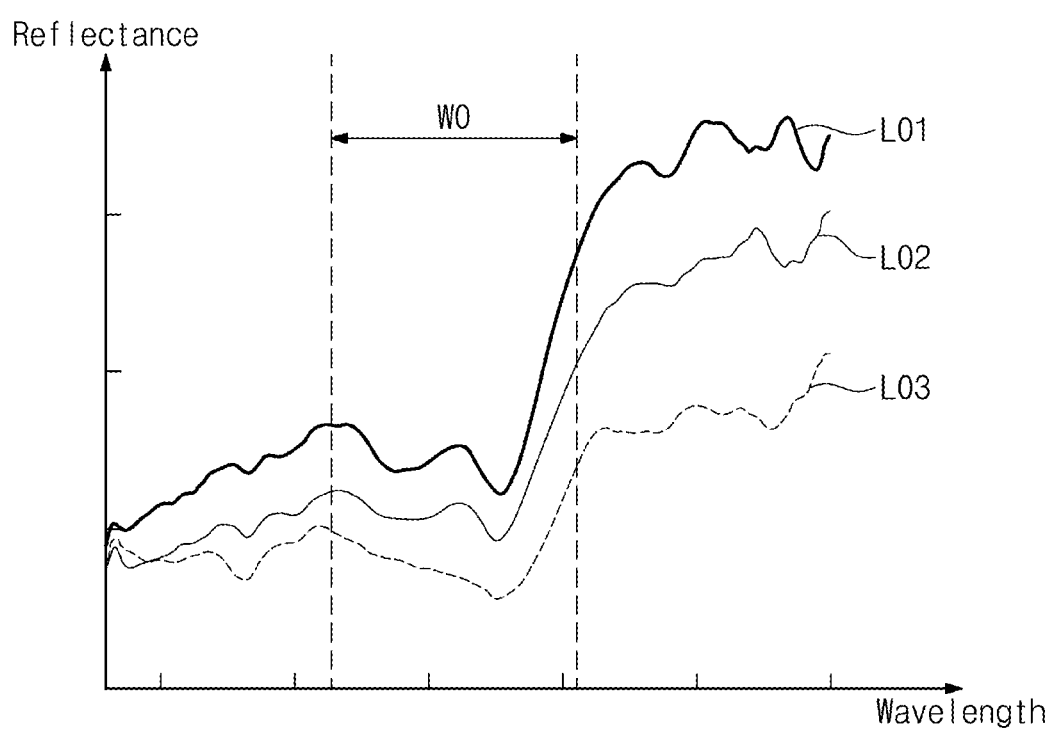
FIG. 8 illustrates a graph indicating spectrum information obtained according to a form of a user fingerprint.

FIG. 8 illustrates a graph indicating spectrum information obtained according to a form of a user fingerprint. For example, a graph of FIG. 8 shows spectrum information about reflectance of light respectively reflected from a fingerprint, a glove, and a printed photo. In the graph of FIG. 8, the X-axis denotes a wavelength, and the Y-axis denotes a reflectance.

Referring to FIG. 8, a first curve L01 indicates spectrum information of light reflected from a user's finger. A second curve L02 indicates spectrum information of light reflected from a glove. A third curve L03 indicates spectrum information of light reflected from a printed photo.

As illustrated in FIG. 8, the first to third curves L01 to L03 indicate different spectrum information (or spectrum characteristics or wavelength characteristics) in the 0-th wavelength band W0. For example, as illustrated in FIG. 8, in the 0-th wavelength band W0, the third curve L03 has one inflection point, and each of the second and third curves L02 and L03 has three inflection points. Also, the reflectance of the second curve L02 may be smaller than the reflectance of the third curve L03. For example, the first curve L01 may come from the absorptivity of hemoglobin of a user's finger.

In other words, whether incident light is reflected from a user's finger, is reflected from a glove, is reflected from a printed photo may be determined by analyzing a spectrum characteristic of light in the 0-th wavelength band W0 described above.

For example, as described above, fingerprint spectrum information of the 0-th wavelength band W0 of light reflected from a user fingerprint may be obtained by the spectrum pixels SPX according to the present disclosure. Whether a touched fingerprint FP comes from a finger of a real person or is forged may be determined by determining whether the obtained fingerprint spectrum information has the spectrum characteristic of the first curve L01 illustrated in FIG. 8.

For example, the 0-th wavelength band W0 may be a wavelength band of wide band light passing through the band limit filters BLF1 and BLF2.

Figure 9A:
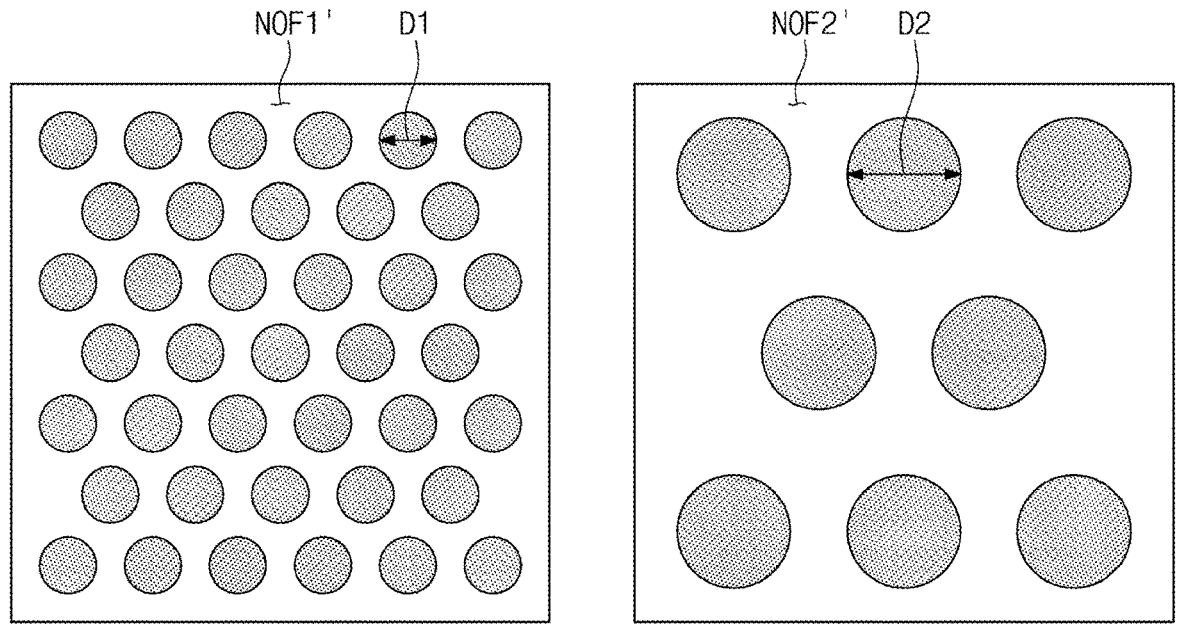
FIGS. 9A and 9B are views for describing another example of nano-optical filters according to an example embodiment.
Figure 9B:
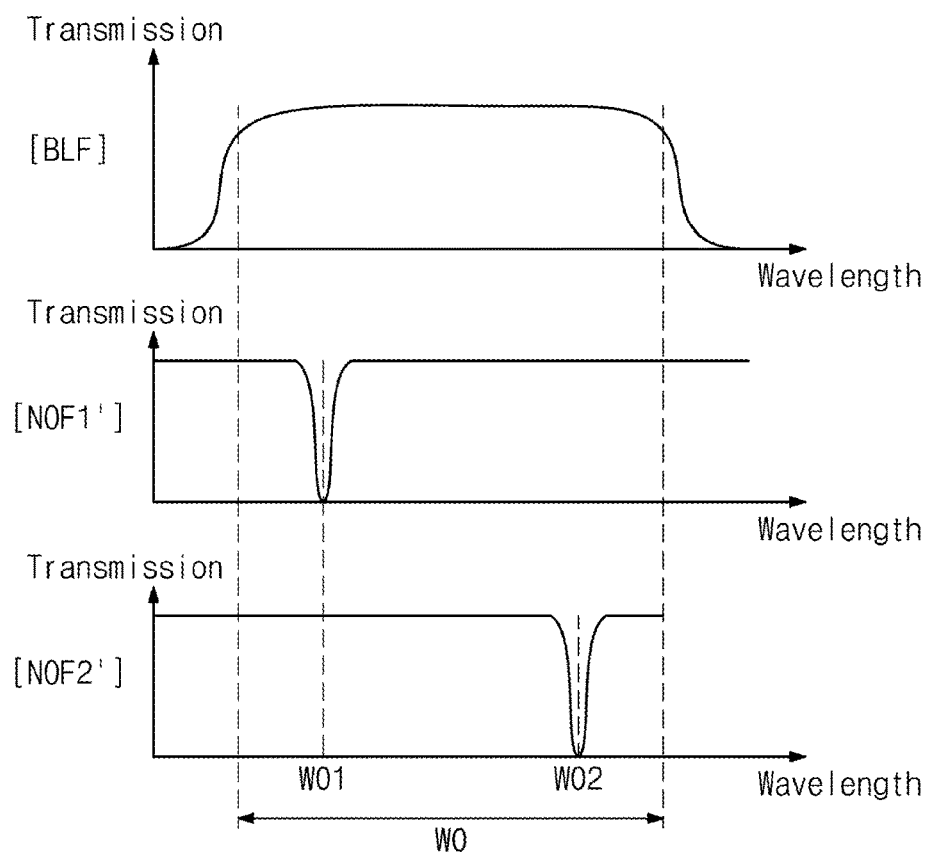

FIGS. 9A and 9B are views for describing another example of nano-optical filters according to an example embodiment. Referring to FIGS. 9A and 9B, nano-optical filters NOF1' and NOF2' may be configured to block narrow band light having a specific wavelength. For example, the nano-optical filters NOF1' and NOF2' illustrated in FIG. 9A may be implemented in the form of a disc unlike the nano-optical filters NOF1 and NOF2 illustrated in FIG. 6A. That is, the first nano-optical filter NOF1' may include a plurality of discs each having a first diameter D1, and the second nano-optical filter NOF2' may include a plurality of discs each having a second diameter D2 greater than the first diameter D1.

The first and second nano-optical filters NOF1 and NOF2 may have different optical characteristics depending on disc diameters. For example, as illustrated in FIG. 9B, each of the band limit filters BLF1 and BLF2 may be an optical filter that passes light of the 0-th wavelength band W0. The first nano-optical filter NOF1' may block only narrow band light, which has a first wavelength W01, of filtered wide band light received from the band limit filter BLF1, and the second nano-optical filter NOF2' may block only narrow band light, which has a second wavelength W02, of filtered wide band light received from the band limit filter BLF2. In this case, values of the first wavelength W1 and the second wavelength W2 may be determined according to diameters of the plurality of discs of the first and second nano-optical filters NOF1' and NOF2'.

As described above, the plurality of spectrum pixels SPX may include the nano-optical filters NOF including a plurality of discs having different diameters and may be configured to detect light of different wavelengths depending on the optical characteristics of the nano-optical filters NOF.

For example, a description is given with reference to FIGS. 6A and 9A as holes or discs included in nano-optical filters are circular. However, the scope and spirit of the present disclosure is not limited. For example, holes or discs included in nano-optical filters may be implemented in various forms for the purpose of passing or blocking only light of a specific wavelength.

Figure 10:
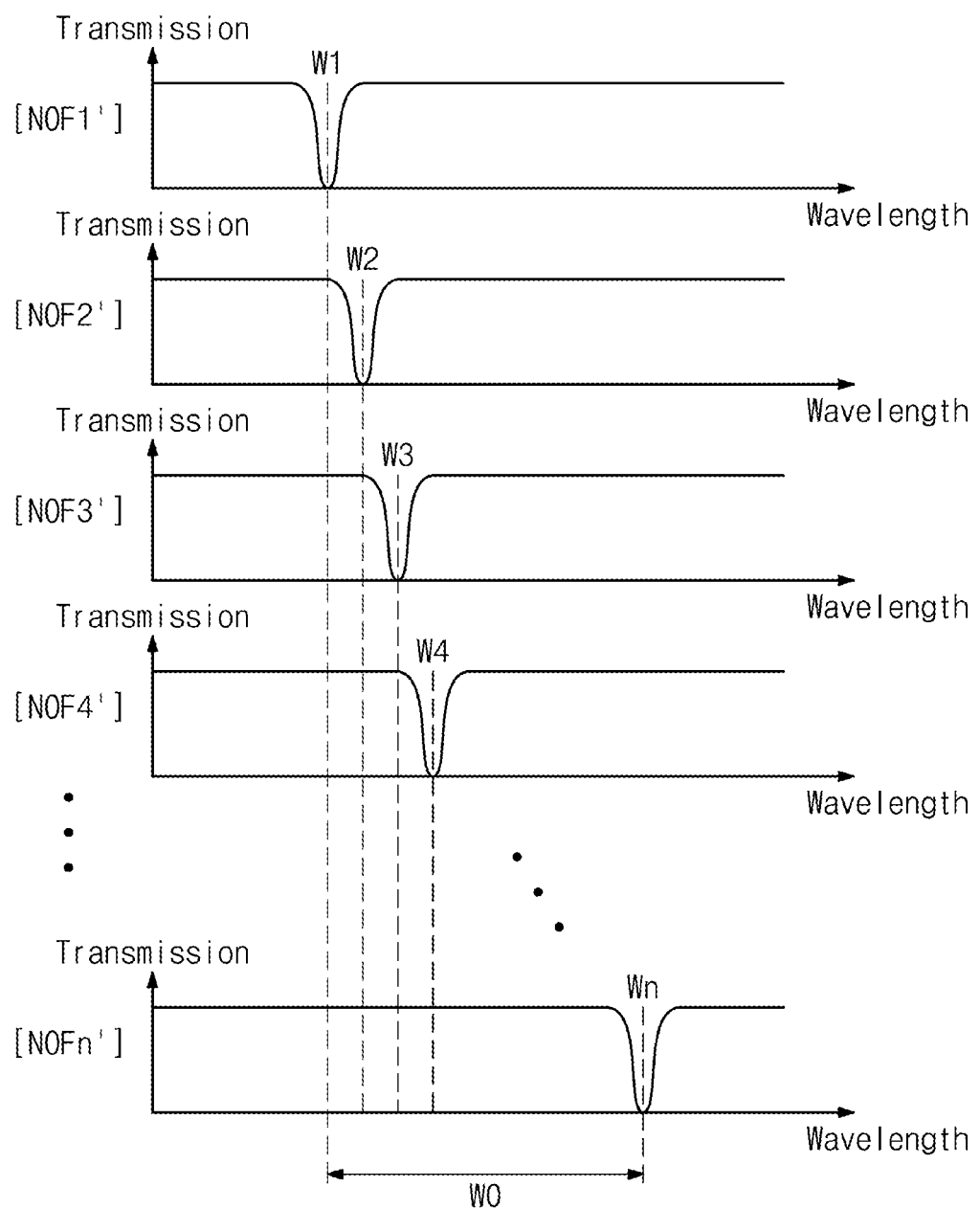
FIG. 10 illustrates graphs indicating optical characteristics of a plurality of nano-optical filters respectively included in the spectrum pixels.

FIG. 10 illustrates graphs indicating optical characteristics of a plurality of nano-optical filters NOF1' to NOFn' included in each spectrum pixels SPX. Referring to FIG. 10, the spectrum pixels SPX may include nano-optical filters NOF1' to NOFn' having different optical characteristics, respectively. The plurality of nano-optical filters NOF1 to NOFn may include discs having different diameters as described above and may have different optical characteristics depending on disc diameters.

The nano-optical filters NOF1' to NOFn' are similar to nano-optical filters of a hole form described above except that the nano-optical filters NOF1' to NOFn' block only narrow band light of a specific wavelength, and thus, a detailed description thereof will not be repeated here.

FIG. 11A to 11D are views illustrating various structures of the fingerprint pixels FPX and the spectrum pixels SPX according to an example embodiment. Various forms of the fingerprint pixels FPX and the spectrum pixels SPX will be described with reference to FIGS. 11A to 11D, but the scope and spirit of the present disclosure is not limited. For a brief description, components that are the same as the above-described components are not described.

Figure 11A:
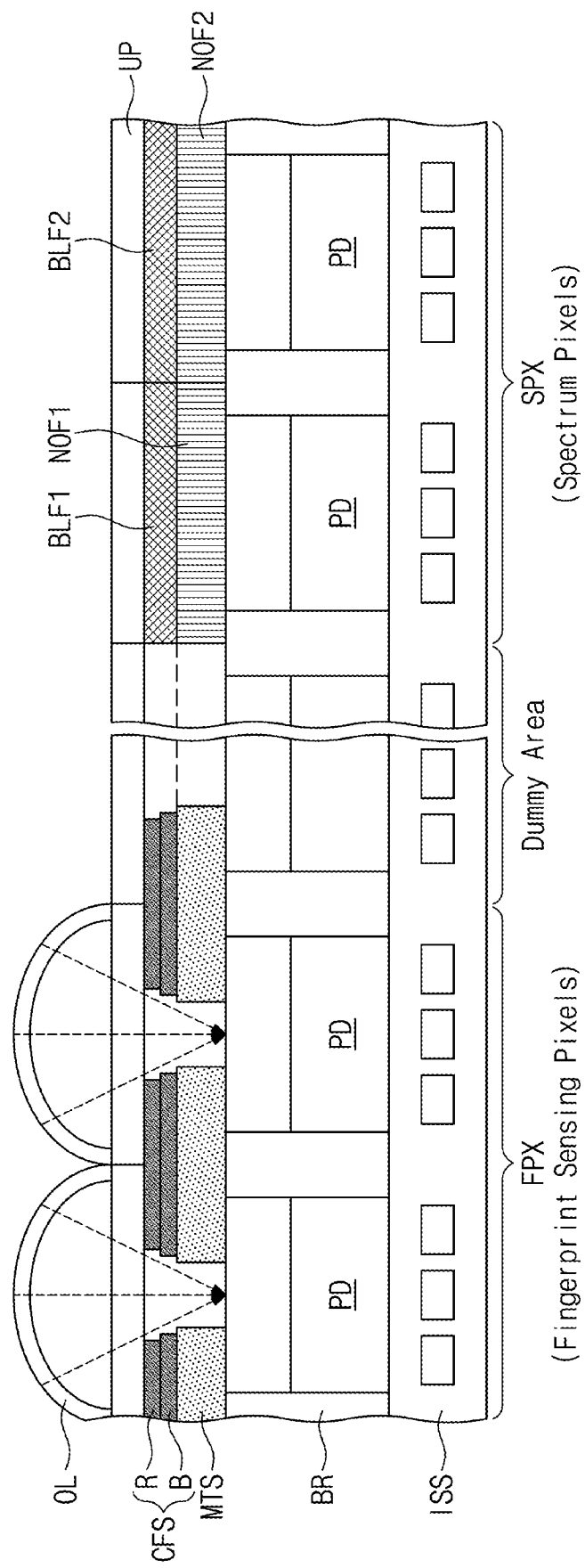
FIG. 11A to 11D are views illustrating various structures of the fingerprint pixels and the spectrum pixels according to an example embodiment.

Referring to FIG. 11A, the fingerprint pixels FPX and the spectrum pixels SPX may be formed on a substrate SUB. Unlike the embodiment of FIG. 4, the color filter structure CFS of the fingerprint pixels FPX may include two color filters "R" and "B." For example, the color filter structure CFS of FIG. 11A may only include the red color filter "R" and the blue color filter "B." That is, the black exterior of the fingerprint sensing pixel array 111 may be implemented by using a red color filter "R" and a blue color filter "B." The remaining components are described above, and thus, a detailed description thereof will not be repeated here.

Figure 11B:
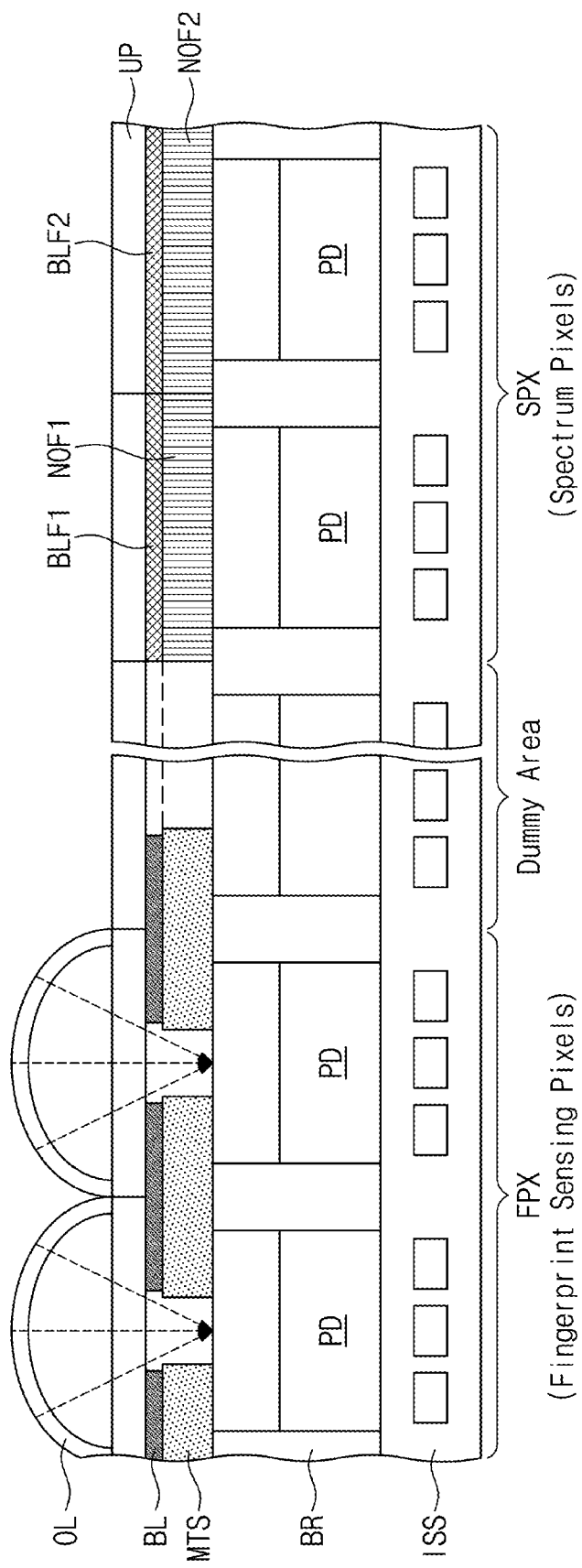

Referring to FIG. 11B, the color filter structure CFS may be implemented with one color filter. For example, as illustrated in FIG. 11B, the color filter structure CFS may include a black color filter BL. The black color filter BL may absorb light of all wavelength bands or block light of all wavelength bands. That is, the black exterior of the fingerprint sensing pixel array 111 may be implemented by the black color filter BL. The remaining components are described above, and thus, a detailed description thereof will not be repeated here.

Figure 11C:
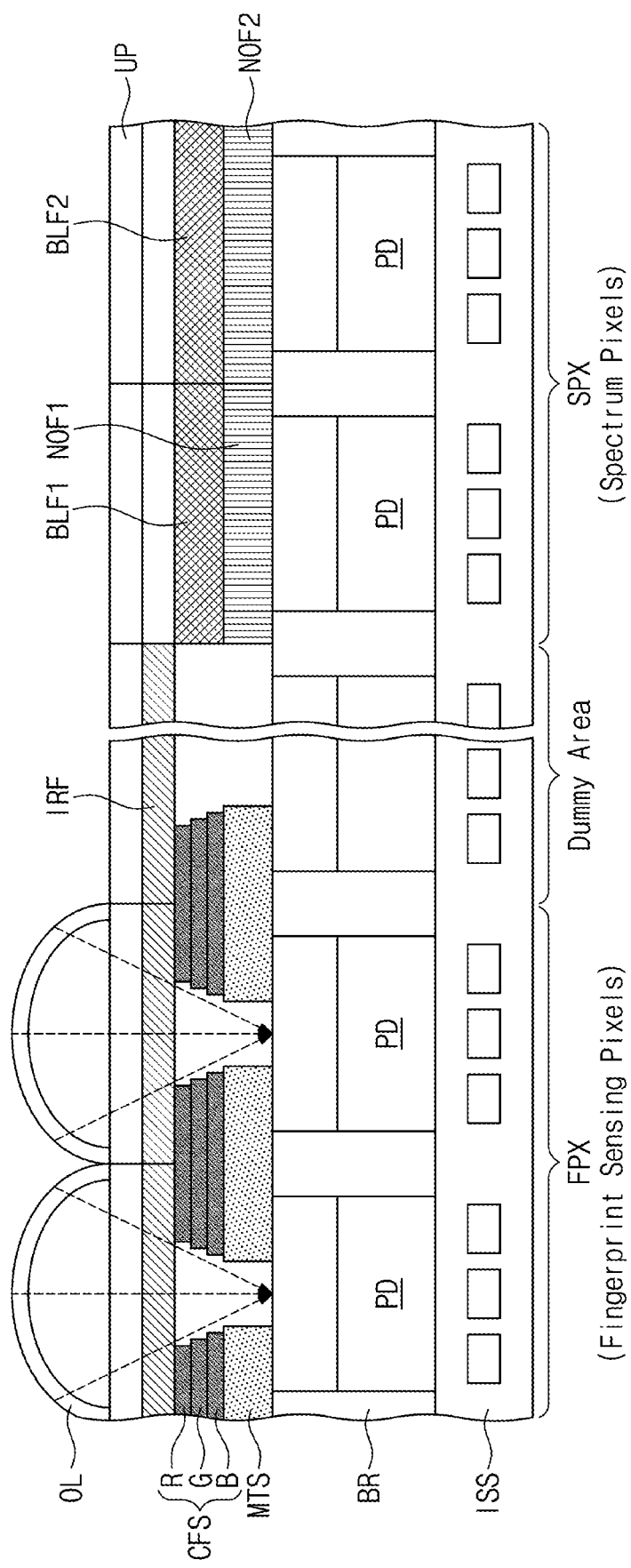

Referring to FIG. 11C, an infrared cut filter IRF may be formed on the color filter structure CFS, and the upper passivation layer UP may be formed on the infrared cut filter IRF. The infrared cut filter IRF may be configured to absorb or block infrared light. Although not illustrated in FIG. 11C, the infrared cut filter IRF may be expanded to the spectrum pixels SPX. The remaining components are described above, and thus, a detailed description thereof will not be repeated here.

Figure 11D:
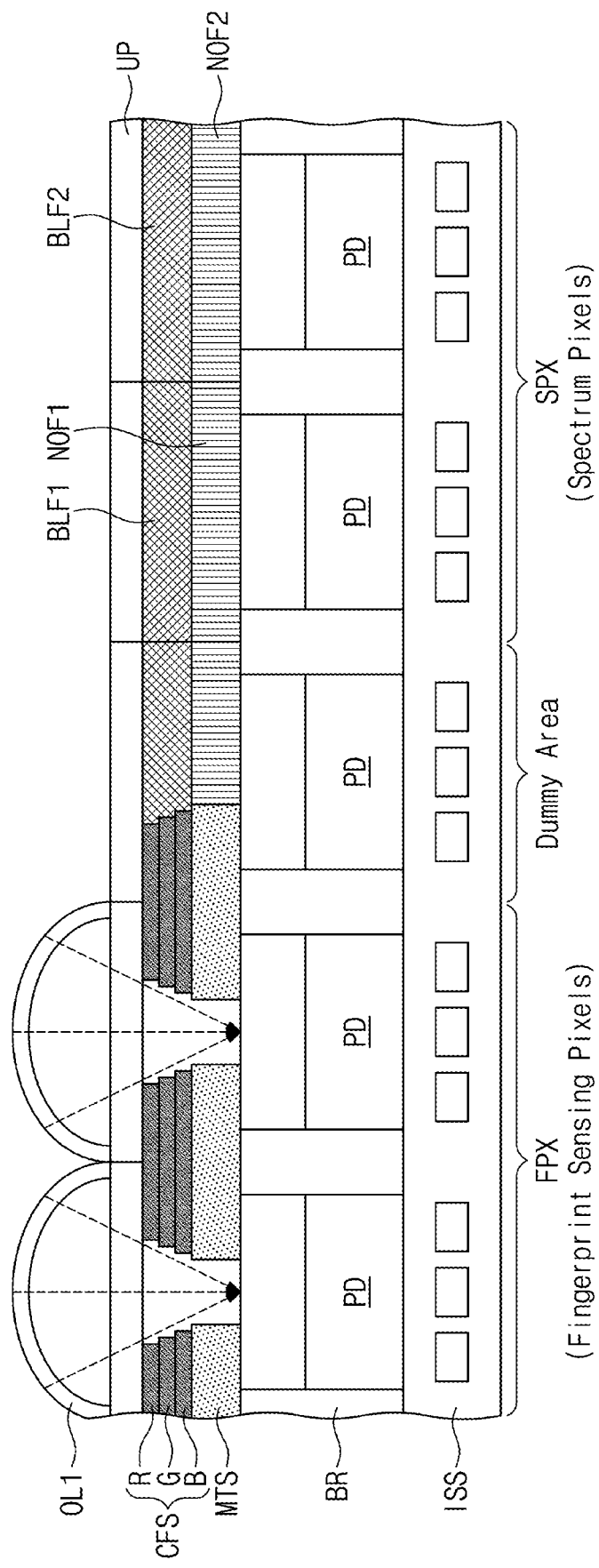

Referring to FIG. 11D, the same materials as the nano-optical filter NOF and the band limit filter BLF may be filled in the dummy area between the fingerprint pixels FPX and the spectrum pixels SPX. For example, the metal shield structure MTS and the color filter structure CFS may be formed in a part of the dummy area, and the nano-optical filter NOF and the band limit filter BLF may be formed in the remaining part of the dummy area. That is, some components of the fingerprint pixels FPX and some components of the spectrum pixels SPX may be formed in the dummy area between the fingerprint pixels FPX and the spectrum pixels SPX.

The fingerprint pixels FPX and the spectrum pixels SPX described above are exemplary, and the scope and spirit of the present disclosure is not limited thereto. The structures and forms of the fingerprint pixels FPX and the spectrum pixels SPX may be variously changed or modified. Also, the order of stacking or manufacturing various components included in the fingerprint pixels FPX and the spectrum pixels SPX may be variously changed or modified without departing from the technical idea of the present disclosure.

FIGS. 12A to 12F are views illustrating various pixel arrangements of the fingerprint sensing pixel array 111 of FIG. 1. For a brief description, it is assumed that the fingerprint sensing pixel array 111 includes pixels arranged in first to eighth rows R1 to R8 and first to eighth columns C1 to C8.

Also, for brevity of illustration, example arrangements of the fingerprint pixels FPX and the spectrum pixels SPX are illustrated in FIGS. 12A to 12F, but the scope and spirit of the present disclosure is not limited. For example, depending on any one of patterns illustrated in FIGS. 12A to 12F, the color filter structure CFS and the band limit filter structure BLFS of the second layer LAY2 may be arranged, or the metal shield structure MTS and the nano-optical filter structure NOFS of the first layer LAY1 may be arranged.

Also, each component illustrated in FIGS. 12A to 12F may be one fingerprint pixel FPX, one spectrum pixel SPX, or a pixel group. For example, spectrum pixels SPX included in the same pixel group or spectrum pixels SPX included in some pixel groups may be configured to sense narrow band light of the same wavelength. Alternatively, spectrum pixels SPX included in the same pixel group may be configured to sense narrow band light of different wavelengths.

Also, a dummy area (or dummy pixels) may exist between the fingerprint pixels FPX and the spectrum pixels SPX. The arrangements of pixels of the fingerprint sensing pixel array 111 illustrated in FIGS. 12A to 12F are exemplary, and the scope and spirit of the present disclosure is not limited thereto.

Figure 12A:
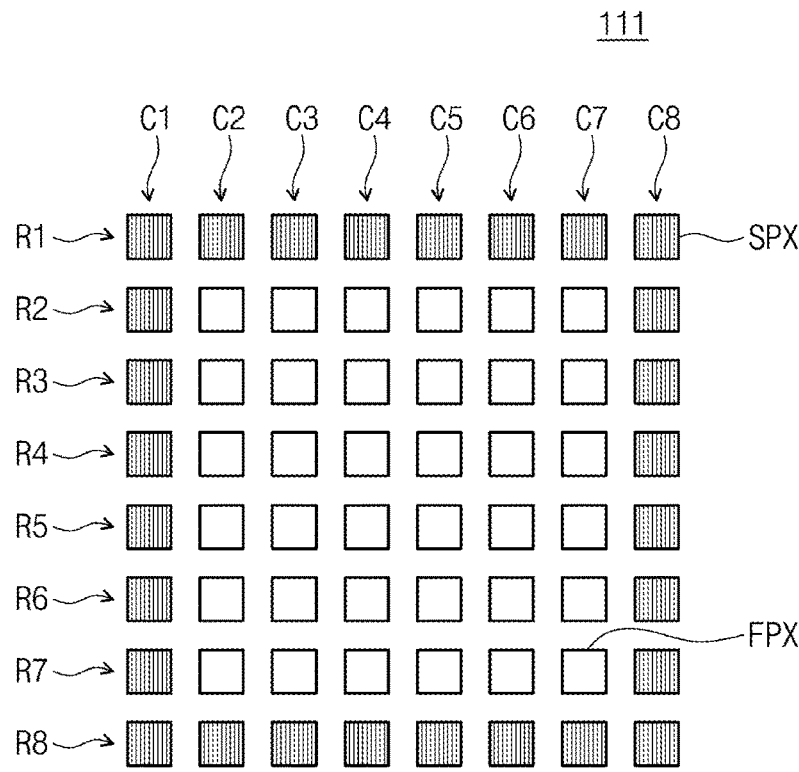
FIGS. 12A to 12F are views illustrating various pixel arrangements of the fingerprint sensing pixel array of FIG. 1.

Referring to FIG. 12A, in the fingerprint sensing pixel array 111, the fingerprint pixels FPX may be disposed in the center of the fingerprint sensing pixel array 111, and the spectrum pixels SPX may be disposed at a periphery of the fingerprint sensing pixel array 111. For example, the fingerprint pixels FPX may be disposed at intersections of the second to seventh rows R2 to R7 and the second to seventh columns C2 to C7, and the spectrum pixels SPX may be disposed at intersections of the first row R1 and the first to eighth columns C1 to C8, at intersections of the eighth row R8 and the first to eighth columns C1 to C8, at intersections of the first to eighth rows R1 to R8 and the first column C1, and at intersections of the first to eighth rows R1 to R8 and the eighth column C8 (i.e., at peripheral areas).

Figure 12B:
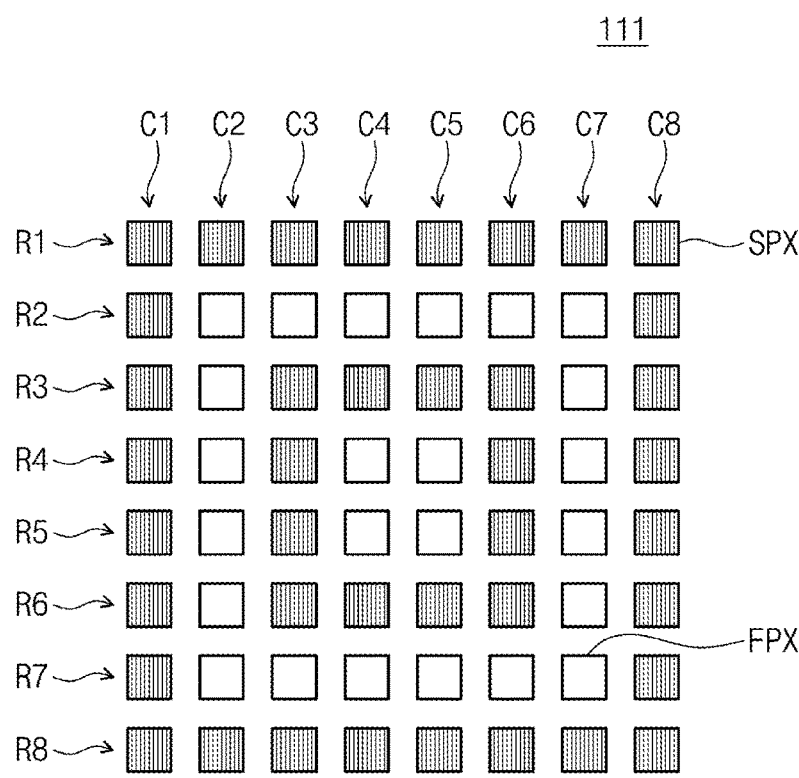

Referring to FIG. 12B, the arrangement of the fingerprint pixels FPX and the spectrum pixels SPX is similar to that of FIG. 12A, but additional spectrum pixels SPX may be disposed on the inside. For example, instead of fingerprint pixels FPX of FIG. 12A, spectrum pixels SPX may be disposed at intersections of the third row R3 and the third to sixth columns C3 to C6, at intersections of the sixth row R6 and the third to sixth columns C3 to C6, at intersections of the third to sixth rows R3 to R6 and the third column C3, and at intersections of the third to sixth rows R3 to R6 and the sixth column C6.

Figure 12C:
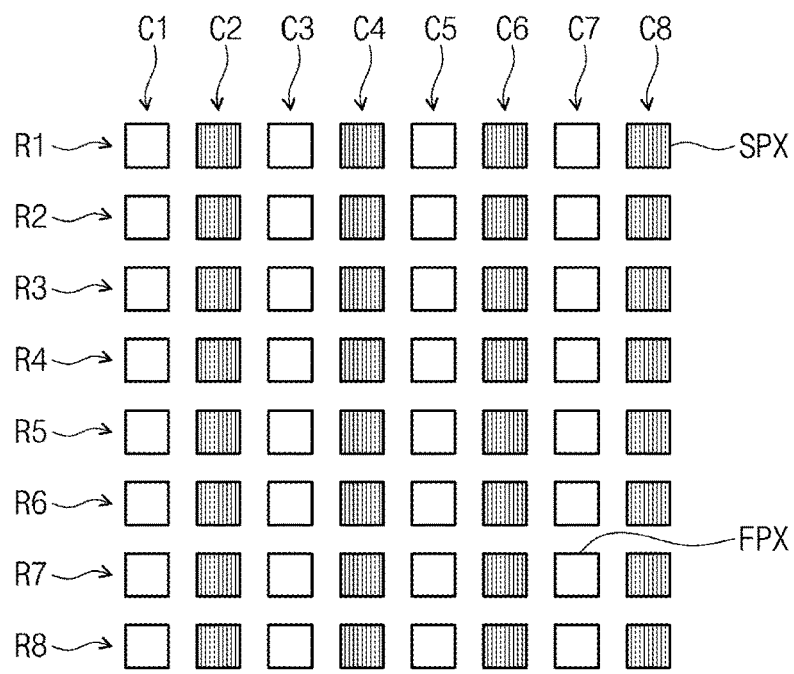

Referring to FIG. 12C, the spectrum pixels SPX may be disposed at some columns (e.g., C2, C4, C6, and C8), and the fingerprint pixels FPX may be disposed at the remaining columns (e.g., C1, C3, C5, C7).

Figure 12D:
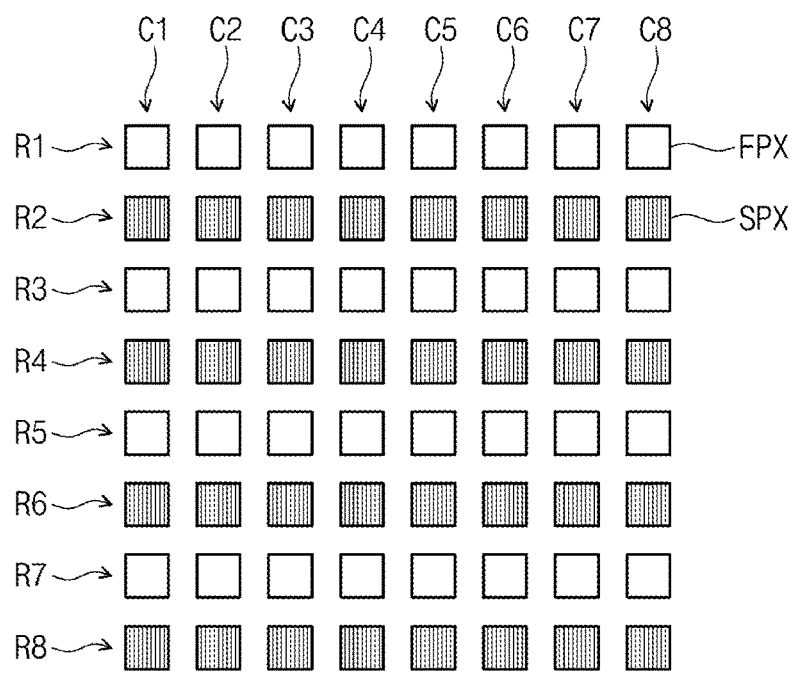

Referring to FIG. 12D, the spectrum pixels SPX may be disposed at some rows (e.g., R2, R4, R6, and R8), and the fingerprint pixels FPX may be disposed at the remaining rows (e.g., R1, R3, R5, and R7).

Figure 12E:
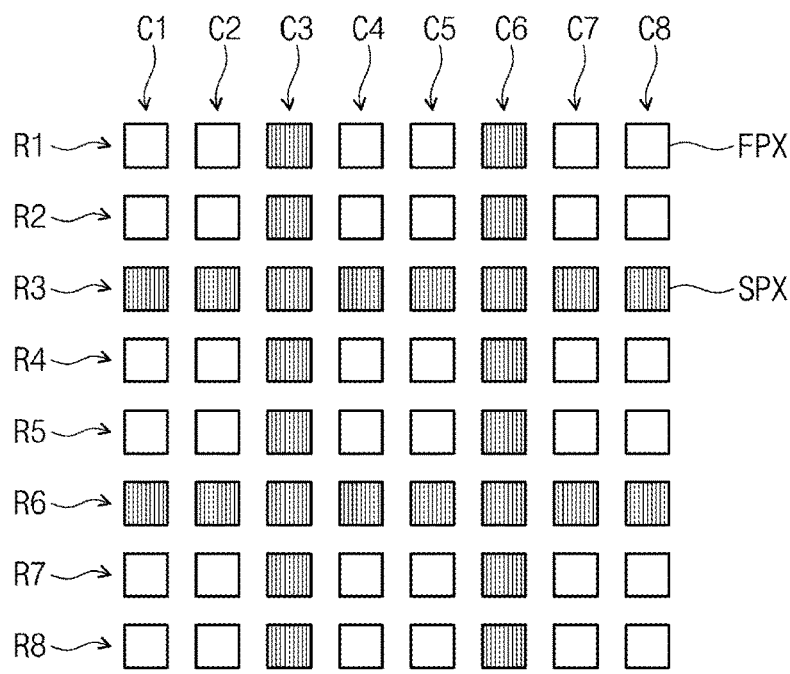

Referring to FIG. 12E, the spectrum pixels SPX may be disposed at intersections of the third row R3 and the first to eighth columns C1 to C8, at intersections of the sixth row R6 and the first to eighth columns C1 to C8, at intersections of the first to eighth rows R1 to R8 and the third column C3, and at intersections of the first to eighth rows R1 to R8 and the sixth column C6, and the fingerprint pixels FPX may be disposed at the remaining intersections other than the intersections.

Figure 12F:
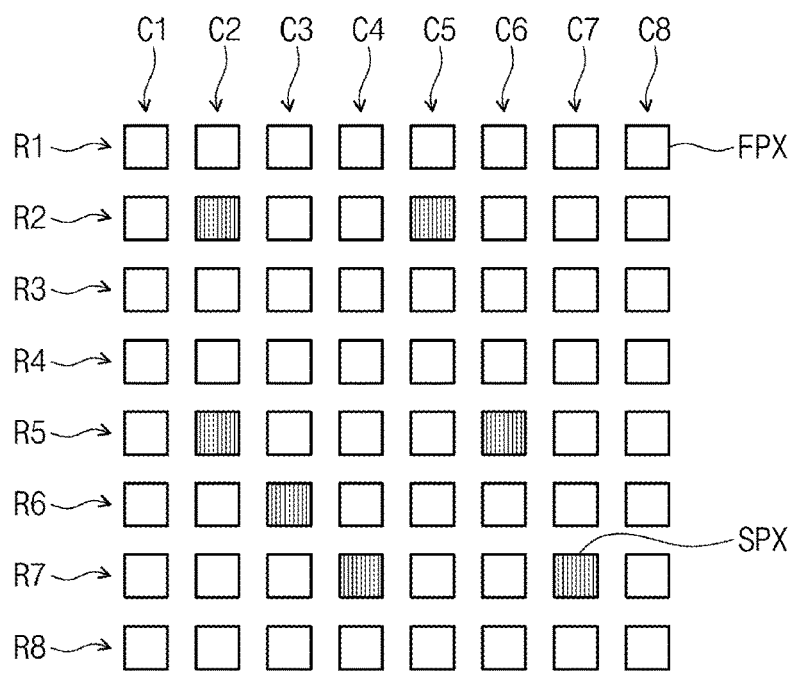

Referring to FIG. 12F, the fingerprint pixels FPX and the spectrum pixels SPX may be disposed at any intersections of rows and columns without a specific arrangement rule. For example, as illustrated in FIG. 12F, the spectrum pixels SPX may be disposed at any intersections, and the fingerprint pixels FPX may be disposed at the remaining intersections. The above ways to arrange the fingerprint sensing pixel array 111 are examples, and the scope and spirit of the present disclosure is not limited thereto. For example, the number of fingerprint pixels FPX of the fingerprint sensing pixel array 111 may be more than the number of spectrum pixels SPX.

As described above, according to an embodiment of the present disclosure, the fingerprint sensor 110 placed on a lower side of the display panel 131 may include a plurality of fingerprint pixels FPX and a plurality of spectrum pixels SPX. The plurality of fingerprint pixels FPX may obtain fingerprint image information with respect to a fingerprint touched on the sensing areas SA and SA' of the touch panel 121 and the display panel 131, and the plurality of spectrum pixels SPX may obtain fingerprint spectrum information with respect to the touched fingerprint. The fingerprint image information may be used for the fingerprint matching operation, and the fingerprint spectrum information may be used for the liveness detection operation. Accordingly, by detecting fingerprint forgery through the liveness detection operation, in addition to user authentication through the fingerprint matching operation, the security and reliability of an electronic device or a fingerprint sensor may be improved.

Figure 13:
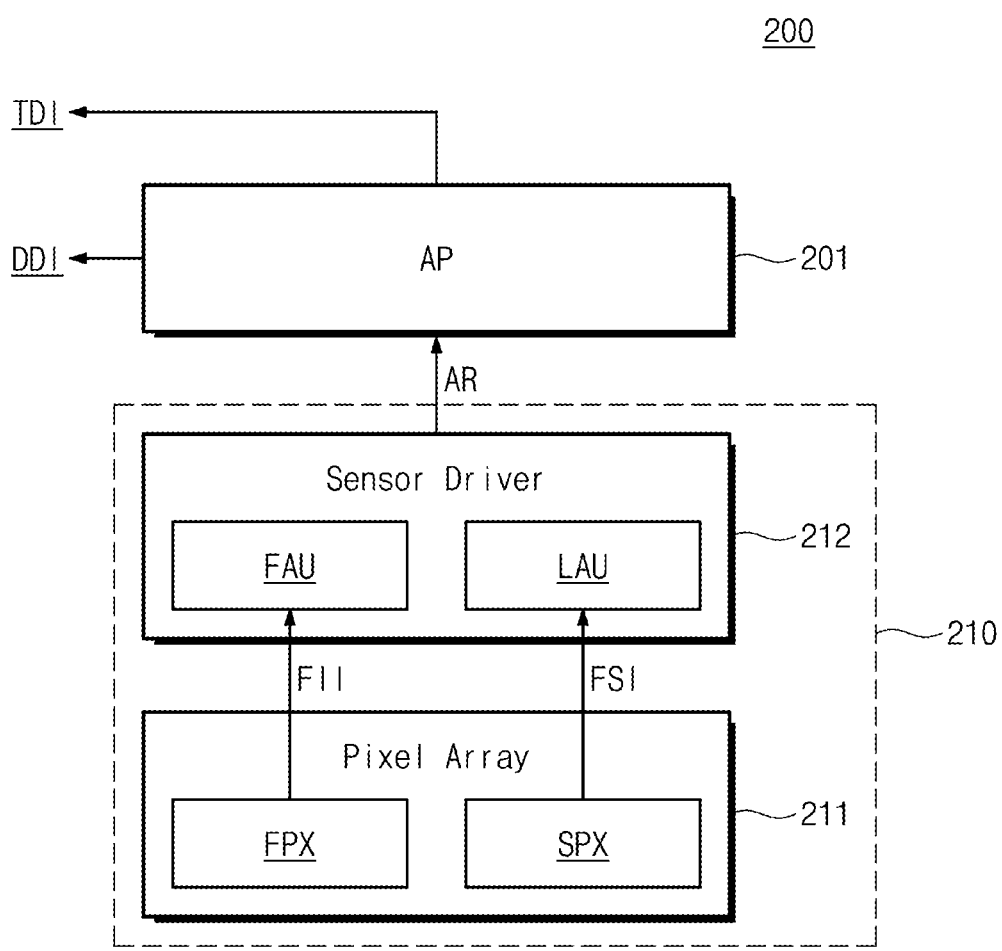
FIG. 13 is a block diagram illustrating an electronic device including a fingerprint sensor according to an example embodiment.

FIG. 13 is a block diagram illustrating an electronic device including a fingerprint sensor according to an example embodiment. For brevity of illustration and for convenience of description, components (e.g., a touch panel, a TDI, a display panel, a DDI, and the like) that are unnecessary to describe an operation of a fingerprint sensor are omitted.

Referring to FIG. 13, an electronic device 200 may include an AP 201 and a fingerprint sensor 210. The fingerprint sensor 210 may include a fingerprint sensing pixel array 211 and a sensor driver 212.

The AP 201 may be configured to control the TDI, the DDI, and the sensor driver 212. For example, the AP 201 may perform the corresponding operation (e.g., device unlock, financial payment, or the like) based on an authentication result AR from the sensor driver 212.

The fingerprint sensing pixel array 211 may include the plurality of fingerprint pixels FPX and the plurality of spectrum pixels SPX. The plurality of fingerprint pixels FPX and the plurality of spectrum pixels SPX are described with reference to FIGS. 1 to 12F, and thus, a detailed description thereof will not be repeated here.

As described above, the plurality of fingerprint pixels FPX may obtain fingerprint image information FII and may provide the obtained fingerprint image information FII to the sensor driver 212. As described above, the plurality of spectrum pixels SPX may obtain fingerprint spectrum information FSI and may provide the obtained fingerprint spectrum information FSI to the sensor driver 212.

The sensor driver 212 may include a fingerprint authentication unit FAU and a liveness authentication unit LAU. The fingerprint authentication unit FAU may perform the fingerprint matching operation, based on the fingerprint image information FII from the plurality of fingerprint pixels FPX. For example, the fingerprint authentication unit FAU may perform the fingerprint matching operation, by comparing the fingerprint image information FII from the plurality of fingerprint pixels FPX and preset (e.g., preregistered) fingerprint image information. In an example embodiment, the preset fingerprint image information may be information that is registered in advance by a user through a separate registration process.

The liveness authentication unit LAU may perform a liveness detection operation, based on the fingerprint spectrum information FSI from the plurality of spectrum pixels SPX. For example, as described above, the fingerprint spectrum information FSI from the plurality of spectrum pixels SPX may include the fingerprint spectrum information FSI of a specific band. The liveness authentication unit LAU may perform the liveness detection operation, by determining whether the fingerprint spectrum information FSI of the specific band included in the fingerprint spectrum information FSI is matched with a specific pattern.

In an example embodiment, whether a fingerprint is a fingerprint of a real person or a fake fingerprint (e.g., an image of a fingerprint on a printed photo, an imprint of a fingerprint on moldable clay) may be determined through the liveness detection operation. A configuration associated with the determination operation is described with reference to FIG. 8, and thus, a detailed description thereof will not be repeated here.

As described above, the sensor driver 212 may transmit the authentication result AR to the AP 201 depending on the operation results of the fingerprint authentication unit FAU and the liveness authentication unit LAU. That is, the sensor driver 212 may automatically perform the fingerprint matching operation and the liveness detection operation. In the case where authentication is successfully made in both the fingerprint authentication unit FAU and the liveness authentication unit LAU, the authentication result AR may include information about authentication success. In contrast, in the case where authentication fails in any one or all of the fingerprint authentication unit FAU and the liveness authentication unit LAU, the authentication result AR may include information about authentication fail.

Figure 14:
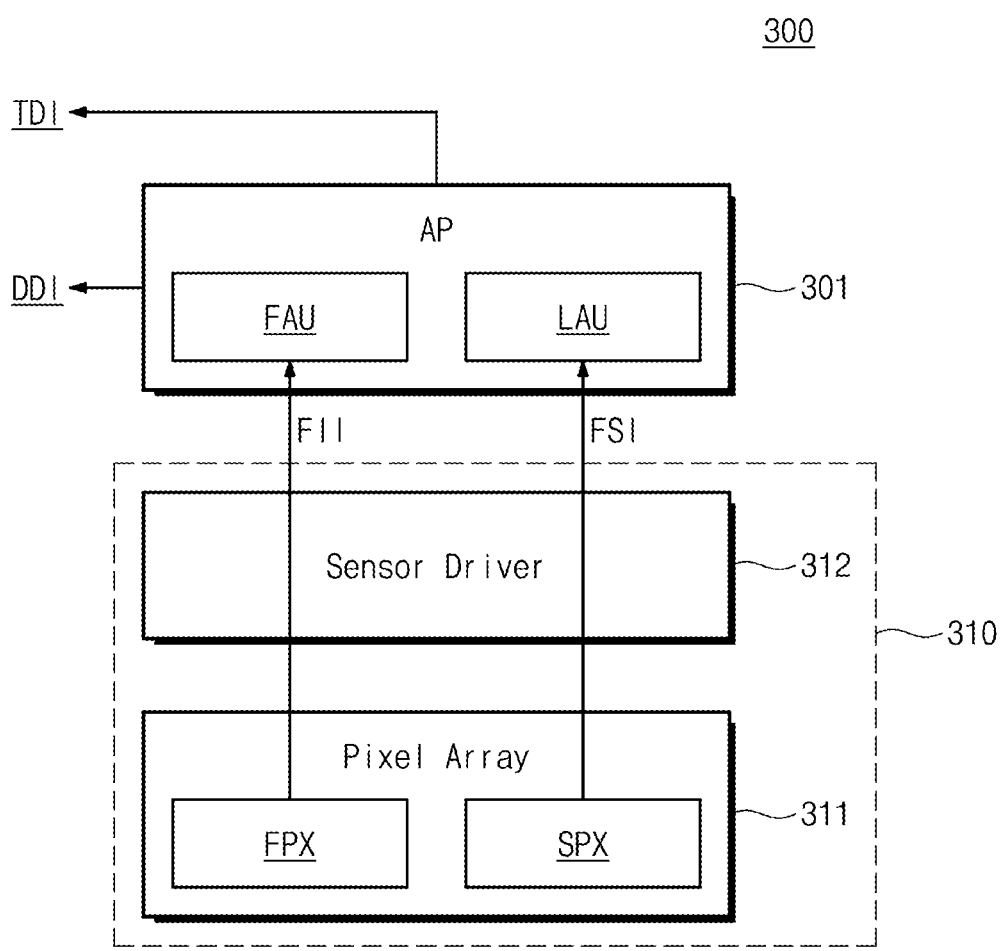
FIG. 14 is a block diagram illustrating the electronic device including the fingerprint sensor according to an example embodiment.

FIG. 14 is a block diagram illustrating an electronic device including a fingerprint sensor according to an example embodiment. Referring to FIG. 14, an electronic device 300 may include an AP 301 and a fingerprint sensor 310. The fingerprint sensor 310 may include a fingerprint sensing pixel array 311 and a sensor driver 312. The fingerprint sensing pixel array 311 may include the plurality of fingerprint pixels FPX and the plurality of spectrum pixels SPX. Components of FIG. 14 are described with reference to FIGS. 1 to 13, and a detailed description thereof will not be repeated here.

Unlike the example embodiment of FIG. 13, in an example embodiment of FIG. 14, the fingerprint authentication unit FAU and the liveness authentication unit LAU may be included in the AP 301. That is, the AP 301 may directly receive the fingerprint image information FII and the fingerprint spectrum information FSI from the sensor driver 312. The fingerprint authentication unit FAU and the liveness authentication unit LAU included in the AP 301 may perform the fingerprint matching operation and the liveness detection operation, based on the received information FII and FSI.

Figure 15:
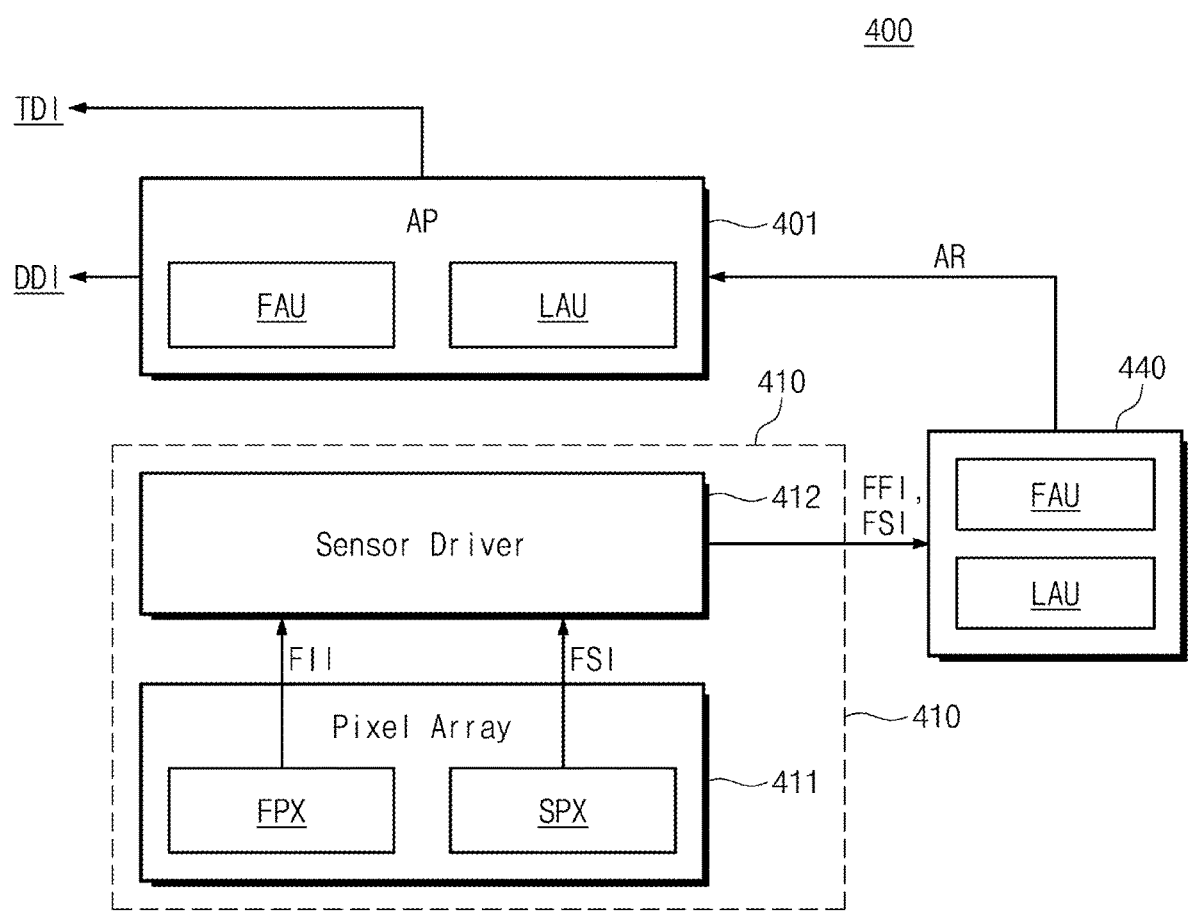
FIG. 15 is a block diagram illustrating the electronic device including the fingerprint sensor according to an example embodiment.

FIG. 15 is a block diagram illustrating an electronic device including a fingerprint sensor according to an example embodiment. Referring to FIG. 15, an electronic device 400 may include an AP 401, a fingerprint sensor 410, and an authentication module 440. The fingerprint sensor 410 may include a fingerprint sensing pixel array 411 and a sensor driver 412. The fingerprint sensing pixel array 411 may include the plurality of fingerprint pixels FPX and the plurality of spectrum pixels SPX. Components of FIG. 15 are described with reference to FIGS. 1 to 14, and a detailed description thereof will not be repeated here.

Unlike the example embodiments of FIGS. 13 and 14, in an example embodiment of FIG. 15, the electronic device 400 may include the separate authentication module 440. The authentication module 440 may be implemented with a separate semiconductor chip or module. Alternatively, the authentication module 440 may be integrated in any other component.

The authentication module 440 may receive the fingerprint image information FII and the fingerprint spectrum information FSI from the sensor driver 412 and may perform the fingerprint matching operation and the liveness detection operation, based on the received information FII and FSI. For example, the authentication module 440 may include the fingerprint authentication unit FAU and the liveness authentication unit LAU, which perform the fingerprint matching operation and the liveness detection operation based on the fingerprint image information FII and the fingerprint spectrum information FSI, respectively.

As described above, a sensor driver, an AP, or a separate authentication module may determine whether a fingerprint is faked and whether a fingerprint is matched, by performing a fingerprint matching operation based on the fingerprint image information FII and performing the liveness detection operation based on the fingerprint spectrum information FSI. Accordingly, an electronic device with improved security and reliability may be provided.

Figure 16:
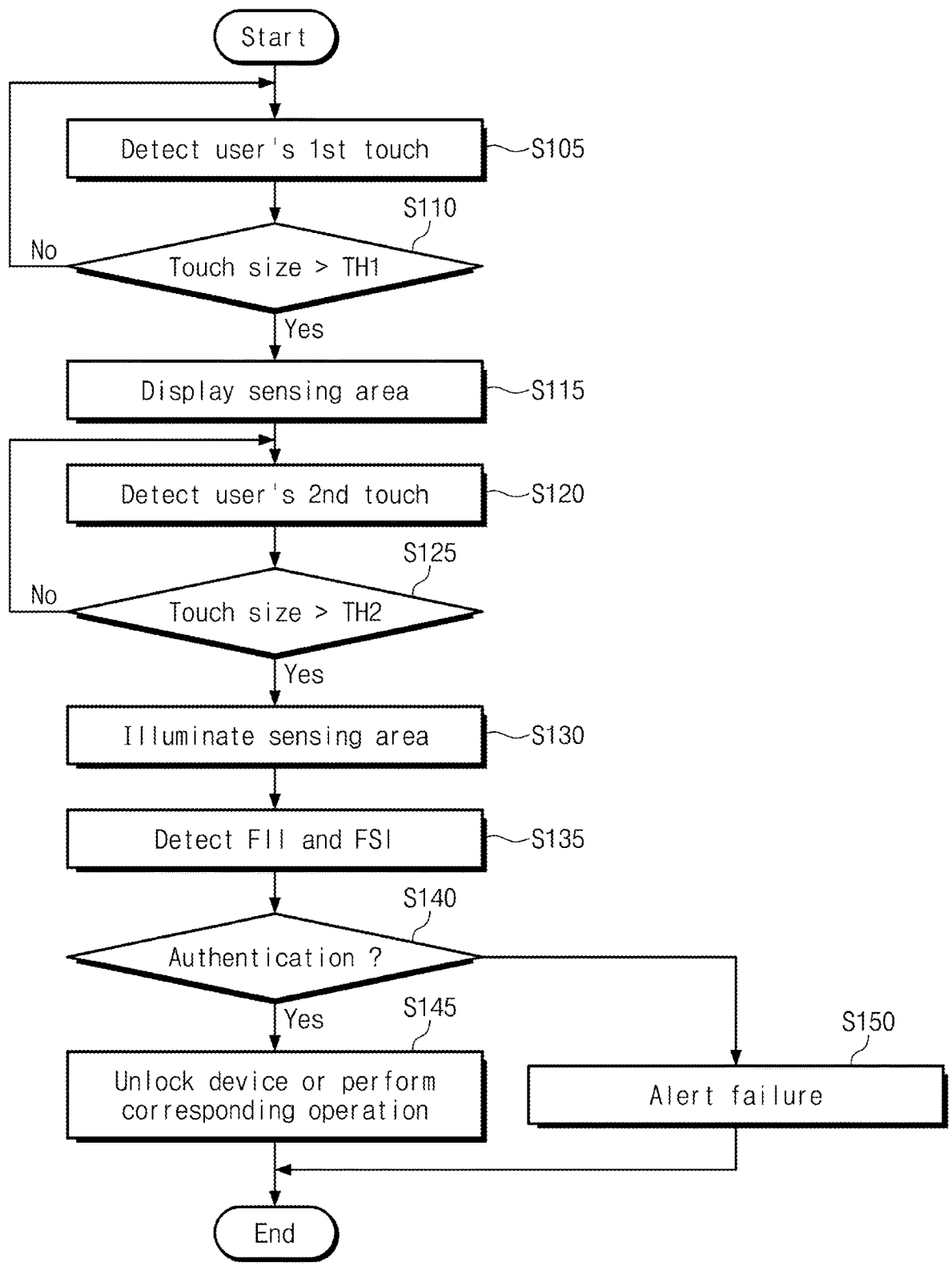
FIG. 16 is a flowchart illustrating an operation method of the electronic device according to an example embodiment.

FIG. 16 is a flowchart illustrating an operation method of an electronic device according to an example embodiment. For convenience of description, an operation method of FIG. 16 will be described with reference to the electronic device 100 of FIG. 1. However, the scope and spirit of the present disclosure is not limited thereto. For example, the electronic devices 200, 300, and 400 of FIGS. 13 to 15 may also operate in a similar manner.

Referring to FIGS. 1 and 11, in operation S105, the electronic device 100 may detect a first touch of a user. For example, the touch panel 121 of the electronic device 100 may sense the first touch of the user made on the sensing area SA. In this case, the touch panel 121 may perform a touch scan operation only on the sensing area SA.

However, the scope and spirit of the present disclosure may not be limited thereto. For example, the touch panel 121 may sense a touch of another area in addition to the sensing area SA. In this case, the touch panel 121 may perform a touch scan operation on the whole area in a power saving mode (e.g., an operation mode where a touch scan frequency is slow).

In operation S110, the electronic device 100 may determine whether the area (or size) of the sensed first touch is greater than a first threshold value TH1. If the area of the sensed first touch is not greater than the first threshold value TH1, it may indicate that a touch has been sensed regardless of the intention of the user. In the case where the area of the sensed first touch is less than the first threshold value TH1, the electronic device may return to operation S105.

In contrast, if the area of the sensed first touch is greater than the first threshold value TH1, the electronic device 100 may be controlled according to the intention of the user. For example, the user may touch the electronic device 100 for the purpose of unlocking the electronic device 100 of a lock state.

In the case where the area of the sensed first touch is greater than the first threshold value TH1, in operation S115, the electronic device may display a sensing area. For example, the AP 101 of the electronic device 100 may control the DDI 132 such that the sensing area SA or SA' is displayed (e.g., indicated by relevant pixels). The DDI 132 may control the display panel 131 such that display pixels included in the sensing area SA' display the sensing area SA'.

For example, operation S105 and operation S110 may be omitted, and operation S115 may be performed by a user's request of another manner.

In operation S120, the electronic device 100 may detect a second touch of the user. For example, for fingerprint recognition, the user may touch the displayed sensing area SA' with his/her finger. In this case, the touch panel 121 may sense the second touch of the user being in contact with the sensing area SA'. For example, the first touch of operation S105 and the second touch of operation S120 may be touches made by separate operations or may be touches made by the same operation.

In operation S125, the electronic device 100 may determine whether the sensed second touch is greater than a second threshold value TH2. If the sensed second touch is not greater than the second threshold value TH2, it may indicate that the contact area is insufficient to obtain the user fingerprint image information FII and the fingerprint spectrum information FSI. In the case where the sensed second touch is not greater than the second threshold value TH2, the electronic device may return to operation S120.

If the sensed second touch is greater than the second threshold value TH2, it may indicate that the contact area is sufficient to obtain the user fingerprint image information FII and the fingerprint spectrum information FSI. In this case, in operation S130, the electronic device 100 may allow light to be emitted in the sensing area SA'. For example, as described with reference to FIG. 3, the electronic device 100 may control the DDI 132 such that the first display pixels DP1 included in the sensing area SA' of the display panel 131 emit light. In this case, the first display pixels DP1 may emit light of preset intensity or greater. For example, the preset intensity may indicate brightness set in advance by the user or may indicate brightness that is determined according to a surrounding environment (e.g., ambient light). Alternatively, the first display pixels DP1 may emit light with maximum intensity.

For example, as described above, the first display pixels DP1 emitting light may be display pixels included in the sensing area SA' or may be display pixels included in an area corresponding to a contact surface of the user touch.

In operation S135, the electronic device 100 may detect the fingerprint image information FII and the fingerprint spectrum information FSI. For example, the fingerprint sensor 110 of the electronic device 100 may detect the fingerprint image information FII and the fingerprint spectrum information FSI, based on light reflected from a fingerprint. A way to detect the fingerprint image information FII and the fingerprint spectrum information FSI is described above, and thus, a detailed description thereof will not be repeated here.

In operation S140, the electronic device 100 may perform an authentication operation, based on the fingerprint image information FII and the fingerprint spectrum information FSI. For example, the electronic device 100 may perform the fingerprint image information based on the fingerprint image information FII and may perform the liveness detection operation based on the fingerprint spectrum information FSI. The fingerprint matching operation and the liveness detection operation are described above, and thus, a detailed description thereof will not be repeated here.

In the case where both the fingerprint matching operation and the liveness detection operation are successful, in operation S145, the electronic device 100 may be unlocked or may perform a relevant operation.

In the case where either or both of the fingerprint matching operation and the liveness detection operation fail, in operation S150, the electronic device 100 may alert authentication failure. For example, the electronic device 100 may display information about the authentication failure through the display panel 131. Alternatively, the electronic device 100 may notify the user of the authentication failure through another separate notification manner (e.g., sound, vibration, or the like). For example, after the authentication failure, the electronic device 100 may perform a re-authentication operation depending on a request of the user. The re-authentication operation may be performed through operation S115 to operation S150.

Figure 17:
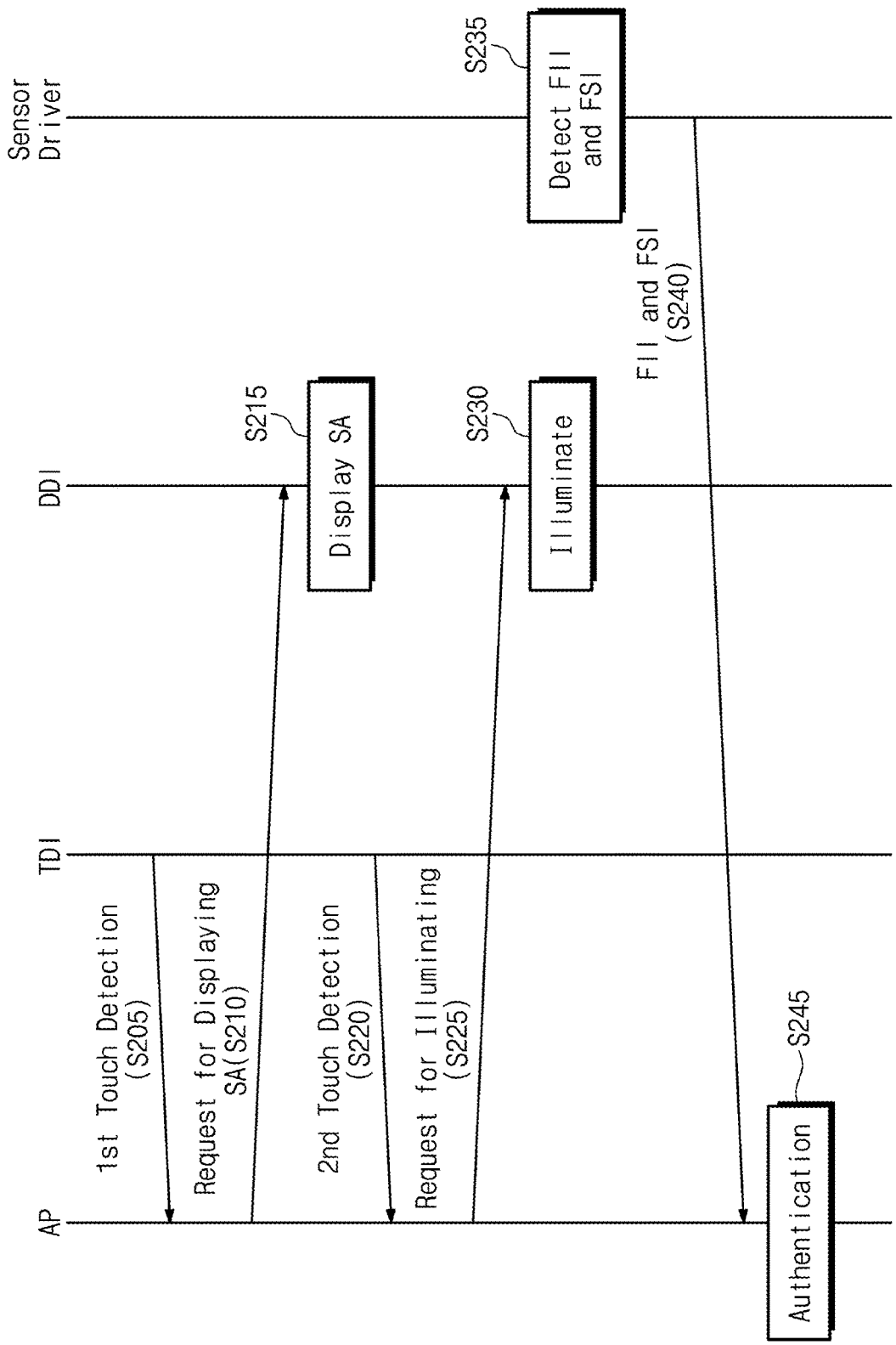
FIG. 17 is a view illustrating an operation of each of an application processor, a touch driving integrated circuit, a display driving integrated circuit, and a sensor driver, which is performed according to an operation method of FIG. 11.

FIG. 17 is a view illustrating an operation of each of an AP, a TDI, a DDI, and a sensor driver, which is performed according to the operation method of FIG. 11. For convenience of description, the same description will not be repeated here.

Referring to FIGS. 1 and 17, in operation S205, the TDI 122 may sense a first touch of the user and may provide information about the sensed first touch to the AP 101.

In operation S210, the AP 101 may transmit a request for displaying the sensing area SA to the DDI 132 in response to the information about the sensed first touch. For example, the AP 101 may perform an operation of comparing the area of the first touch (operation S110 of FIG. 11) and may perform operation S210 depending on the comparison result. Alternatively, the operation of comparing the area of the first touch (operation S110 of FIG. 11) may be performed in the TDI 122.

In operation S215, the DDI 132 may display the sensing area SA' in response to the request of the AP 101. For example, the DDI 132 may control the display panel 131 to allow at least a part of display pixels included in the sensing area SA' to emit light.

Afterwards, in operation S220, the TDI 122 may sense a second touch of the user and may provide information about the sensed second touch to the AP 101.

In operation S225, the AP 101 may transmit a request for light-emitting to the DDI 132 in response to the information about the sensed second touch. For example, the request for light-emitting may be a request that allows the first display pixels DP1 included in the sensing area SA' emit light of predetermined intensity or greater.

For example, as in the above description, the AP 101 may perform an operation of comparing the area of the second touch (operation S125 of FIG. 11) and may perform operation S225 depending on the comparison result. Alternatively, the operation of comparing the area of the second touch (operation S125 of FIG. 11) may be performed in the TDI 122.

In operation S230, the DDI 132 may control the display panel 131 depending on the request of the AP 101, to allow the display pixels DP included in the sensing area SA' to emit light.

In operation S235, the sensor driver 112 may detect the fingerprint image information FII and the fingerprint spectrum information FSI of a fingerprint of the user touched on the touch panel 121.

In operation S240, the sensor driver 112 may transmit the fingerprint image information FII and the fingerprint spectrum information FSI to the AP 101.

In operation S245, the AP 101 may perform an authentication operation (i.e., the fingerprint matching operation and the liveness detection operation), based on the fingerprint image information FII and the fingerprint spectrum information FSI.

The operation method described with reference to FIG. 17 is an example, and the scope and spirit of the present disclosure is not limited thereto. For example, although not illustrated in drawings, the TDI 122, the DDI 132, and the sensor driver 112 may perform the above-described detection and authentication on the fingerprint image information FII and the fingerprint spectrum information FSI without intervention of the AP 101. That is, the TDI 122, the DDI 132, and the sensor driver 112 may perform the above-described information detection and authentication operation by directly exchanging information with each other, and may provide a final authentication result to the AP 101.

Figure 18:
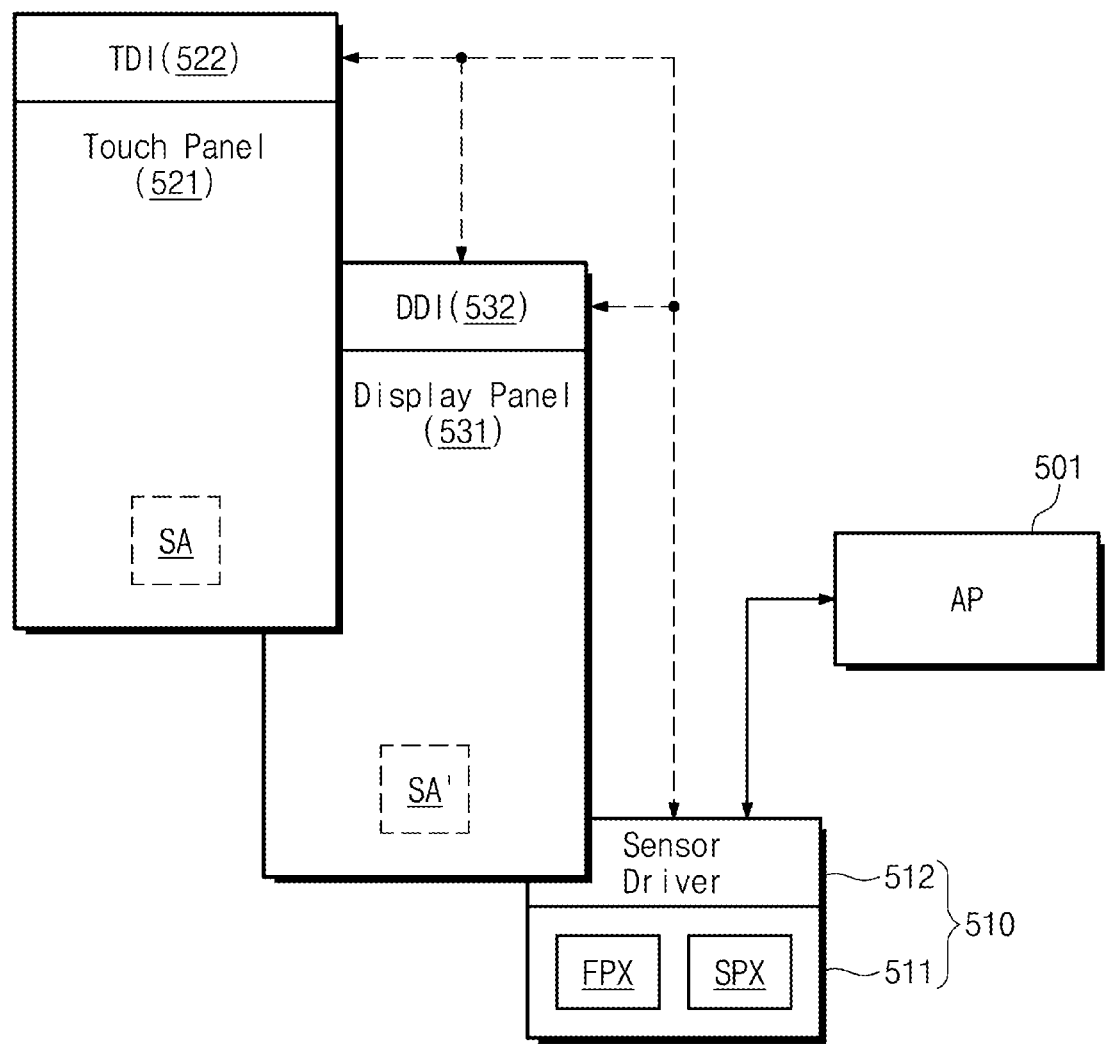
FIG. 18 is a block diagram illustrating the electronic device according to an example embodiment.

FIG. 18 is a block diagram illustrating an electronic device 500 according to an embodiment of the present disclosure. For a brief description, components that are the same as the above-described components are not described here. Referring to FIG. 18, an electronic device 500 may include a fingerprint sensing pixel array 511, a sensor driver 512, a touch panel 521, a TDI 522, a display panel 531, and a DDI 532.

Unlike the example embodiment of FIG. 1, in an example embodiment of FIG. 18, the sensor driver 512, the TDI 522, and the DDI 532 may communicate with each other without intervention of an AP 501 for the purpose of obtaining the fingerprint image information FII and the fingerprint spectrum information FSI of a user fingerprint and performing the fingerprint matching operation and the liveness detection operation based on the obtained fingerprint image information FII and the obtained fingerprint spectrum information FSI.

For example, the TDI 522 may sense a touch of the user and may provide information about the sensed touch to the DDI 532 without passing through the AP 501. The DDI 532 may allow display pixels included in the sensing area SA' to emit light in response to the received information. The DDI 532 may provide the sensor driver 512 with information indicating that the display pixels emit light, without passing through the AP 501. In response to the received information, the sensor driver 512 may obtain the fingerprint image information FII and the liveness detection operation FSI and may perform the fingerprint matching operation and the liveness detection operation, based on the fingerprint image information FII and the fingerprint spectrum information FSI.

As described above, the sensor driver 512, the TDI 522, and the DDI 532 may communicate with each other without intervention of the AP 501. In this case, since the fingerprint matching operation and the liveness detection operation are performed without intervention of the AP 501, even though the AP 501 does not wake from a sleep mode, a normal authentication operation may be performed. Accordingly, a low-power authentication operation may be performed.

Figure 19:
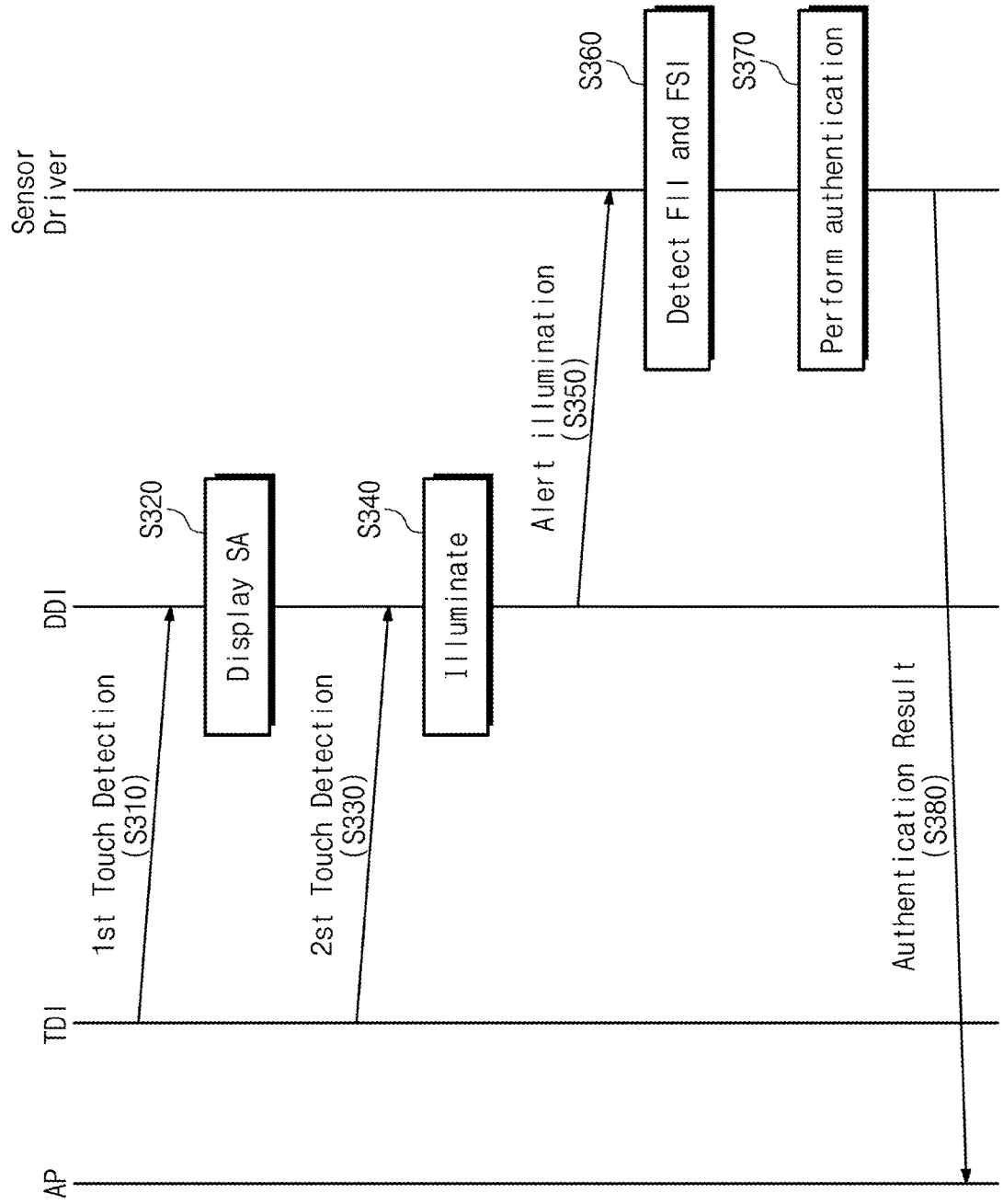
FIG. 19 is a view illustrating an operation of the electronic device of FIG. 18.

FIG. 19 is a view illustrating an operation of the electronic device 500 of FIG. 18. Referring to FIGS. 18 and 19, in operation S310, the TDI 522 may sense a first touch of the user and may transmit information about the sensed first touch to the DDI 532.

In operation S320, the DDI 532 may display the sensing area SA' in response to the received information. For example, under the control of the DDI 532, some pixels of the sensing area SA' may emit light such that the user perceives an area where his/her fingerprint will be touched. That is, when some pixels emit light, an area where the user's fingerprint will be touched may be displayed.

In operation S330, the TDI 320 may sense a second touch of the user and may transmit information about the sensed second touch to the DDI 532.

In operation S340, the DDI 532 may allow some pixels of the sensing area SA' to emit light. In this case, some pixels of the sensing area SA' may emit light of preset intensity or greater. Alternatively, some pixels of the sensing area SA' may emit light with maximum intensity.

In operation S350, the DDI 532 may provide the sensor driver 512 with information indicating that some pixels emit light.

In operation S360, the sensor driver 512 may obtain the fingerprint image information FII and the fingerprint spectrum information FSI in response to the received information. In operation S370, the sensor driver 512 may perform an authentication operation (i.e., the fingerprint matching operation and the liveness detection operation). Operation S360 and operation S370 are described above, and thus, a detailed description thereof will not be repeated here.

In operation S380, the sensor driver 512 may transmit the authentication result to the AP 501. For example, the AP 501 may perform an operation (e.g., unlock, sign-in, authentication failure notification, or the like) corresponding to the received authentication result.

As described above, components of the electronic device 500 according to an example embodiment may perform the fingerprint matching operation and the liveness detection operation without intervention of the AP 501. Since an operation of the AP 501 is not required for the authentication operation, a fingerprint sensor may be driven with relatively low power.

Figure 20:
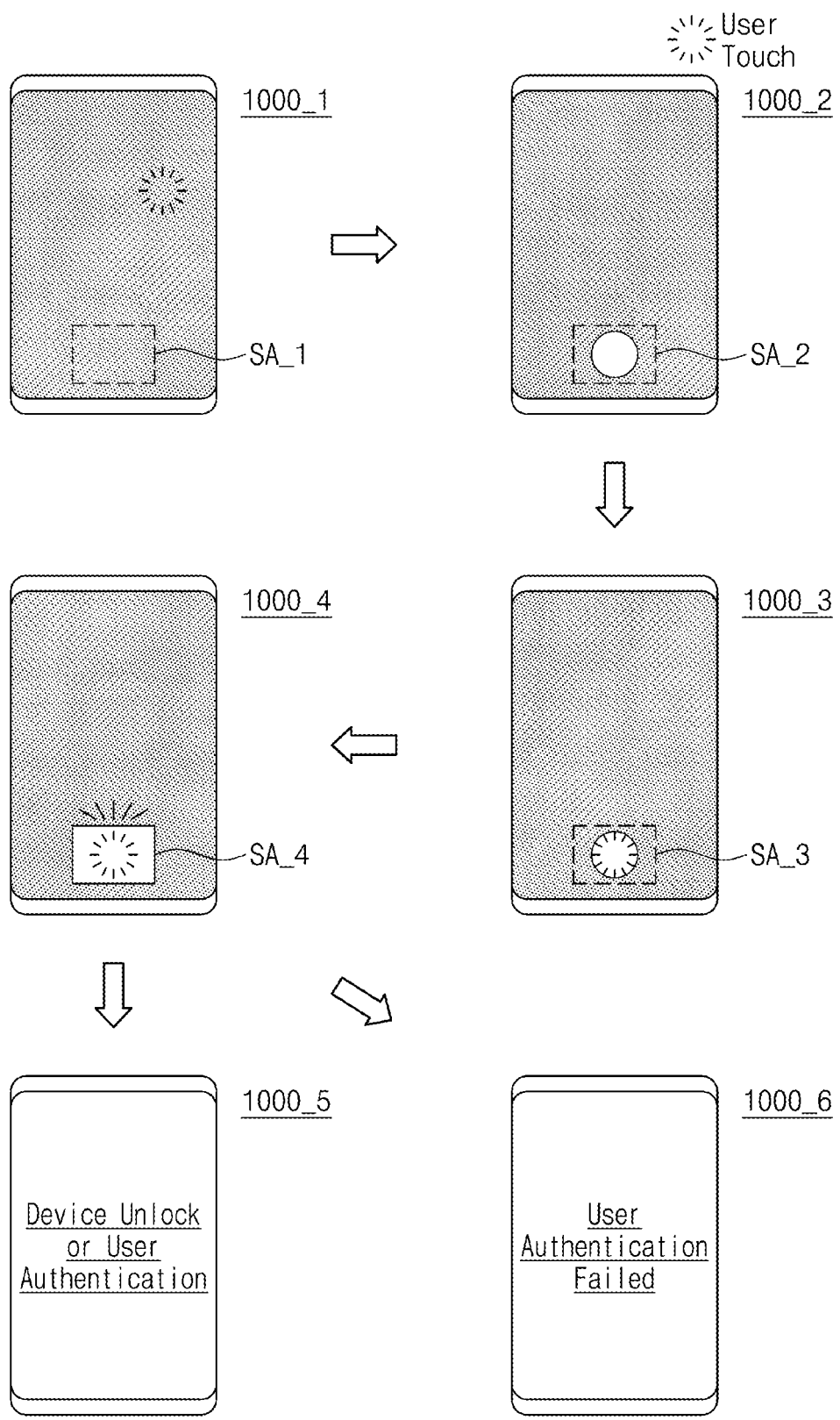
FIG. 20 is a conceptual diagram for describing an authentication process according to an example embodiment.

FIG. 20 is a conceptual diagram for describing an authentication process according to an example embodiment. For a brief description, components that are unnecessary to describe an authentication process are not described.

Referring to FIG. 20, a display area of an electronic device 1000_1 may be in a turn-off state (e.g., power off state). In this state, a user touch may be sensed. For example, a touch of the user may be sensed in an area other than a sensing area SA_1. Alternatively, although not illustrated in FIG. 20, in the electronic device 1000_1, an area for sensing a touch of the user may be limited to the sensing area SA_1.

Afterwards, an electronic device 1000_2 may allow light to be emitted from a sensing area SA_2 or a part of the sensing area SA_2. This may be an indication for inducing a touch of the user.

Afterwards, an electronic device 1000_3 may sense a user touch on a sensing area SA_3.

Afterwards, an electronic device 1000_4 may allow light to be emitted from a sensing area SA_4, for the purpose of obtaining the fingerprint image information FII and the fingerprint spectrum information FSI from the user touch. In this case, the area from which light is emitted may be the whole sensing area SA_4 or may be an area (i.e., a user touch area), in which the user touch is sensed, of the sensing area SA_4.

Afterwards, in the case where a fingerprint matching operation and a liveness detection operation based on the obtained fingerprint image information FII and the obtained fingerprint spectrum information FSI are successful, an electronic device 1000_5 may be unlocked or may display information indicating that the user authentication is completed.

Alternatively, in the case where any one or all of the fingerprint matching operation and the liveness detection operation based on the obtained fingerprint image information FII and the obtained fingerprint spectrum information FSI fail, an electronic device 1000_6 may display information about authentication failure. For example, the above-described authentication manner may be used in various different operations requiring device unlock, financial payment, or authentication.

In an example embodiment, an AP included in an electronic device may be configured to control an overall flow of the above-described authentication operation. Alternatively, components included in the electronic device may be configured to perform the above-described authentication operation without intervention of the AP.

Figure 21:
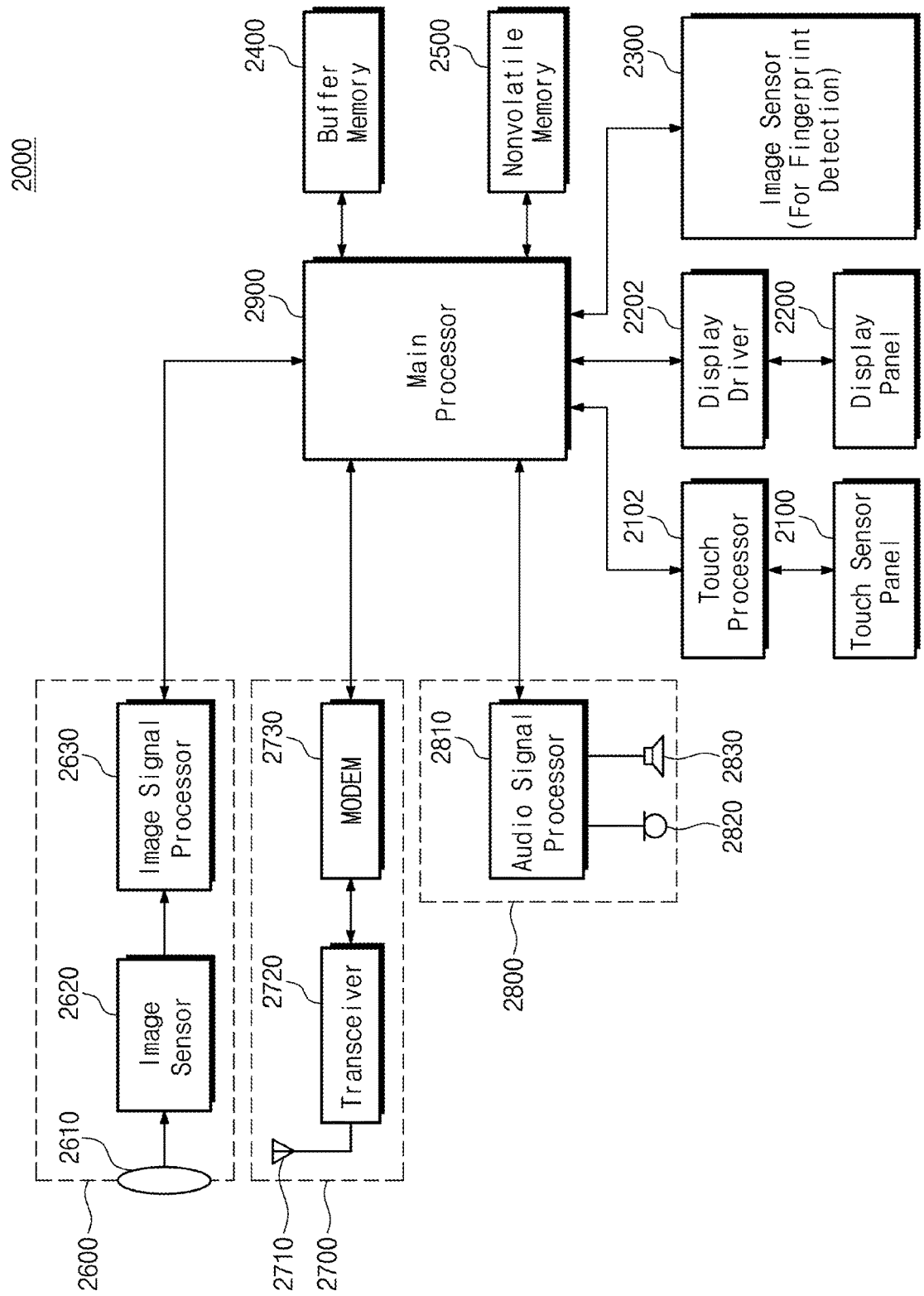
FIG. 21 is a conceptual diagram illustrating an example implementation of the electronic device performing a fingerprint detection function.

FIG. 21 is a conceptual diagram illustrating an exemplary implementation of an electronic device performing a fingerprint detection function, according to an example embodiment. Referring to FIG. 21, an electronic device 2000 may include a touch sensor panel 2100, a touch processor 2102, a display panel 2200, a display driver 2202, an image sensor 2300 for fingerprint detection, a buffer memory 2400, a nonvolatile memory 2500, an image processor 2600, a communication block 2700, an audio processor 2800, and a main processor 2900. For example, the electronic device 2000 may be one of various electronic devices such as a portable communication terminal, a personal digital assistant (PDA), a portable media player (PMP), a digital camera, a smartphone, a tablet computer, a laptop computer, and a wearable device.

The touch sensor panel 2100, the touch processor 2102, the display panel 2200, the display driver 2202, the image sensor 2300, and the main processor 2900 may respectively correspond to a touch panel, a TDI, a display panel, a DDI, a fingerprint sensor, and an AP described with reference to FIGS. 1 to 13.

The image sensor 2300 may be disposed under the touch display panel 2100 and/or the display panel 2200 to spatially correspond to a specific area on the touch display panel 2100 and/or the display panel 2200. The electronic device 2000 may provide an optics-based fingerprint detection function by using the image sensor 2300. For example, the image sensor 2300 may include the plurality of fingerprint pixels FPX and the plurality of spectrum pixels SPX and may obtain the fingerprint image information FII and the fingerprint spectrum information FSI.

The image sensor 2300 may share an area on the electronic device 2000 with the touch display panel 2100 and/or the display panel 2200. The image sensor 2300 may not need an additional area on the electronic device 2000. Accordingly, it may be possible to reduce the size of the electronic device 2000, or a spare area may be used for any other purpose. In addition, a configuration and an operation for performing a fingerprint detection function may be simplified.

The buffer memory 2400 may store data to be used for an operation of the electronic device 2000. For example, the buffer memory 2400 may temporarily store data that are processed or to be processed by the main processor 2900. For example, the buffer memory 2400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 2500 may store data regardless of power supply. For example, the nonvolatile memory 2500 may include at least one of various nonvolatile memories such as a flash memory, a PRAM, a MRAM, a ReRAM, and a FRAM. For example, the nonvolatile memory 2500 may include an embedded memory and/or a removable memory of the electronic device 2000.

The image processor 2600 may receive light through a lens 2610. An image sensor 2620 and an image signal processor 2630 included in the image processor 2600 may generate image information about an external object, based on the received light.

The communication block 2700 may exchange signals with an external device/system through an antenna 2710. A transceiver 2720 and a modulator/demodulator (modem) 2730 of the communication block 2700 may process signals exchanged with the external device/system, based on at least one of various wireless communication protocols: long-term evolution (LTE), worldwide interoperability for microwave access (WiMax), Global System for Mobile Communications (GSM), code-division multiple access (CDMA), Bluetooth, near-field communication (NFC), Wi-Fi, and radio-frequency identification (RFID).

The audio processor 2800 may process an audio signal by using an audio signal processor 2810. The audio processor 2800 may receive an audio input through a microphone 2820 or may provide an audio output through a speaker 2830.

The main processor 2900 may control overall operations of the electronic device 2000. The main processor 2900 may control/manage operations of elements of the electronic device 2000. The main processor 2900 may process various operations for operating the electronic device 2000.

As described above, an electronic device according to an example embodiment of the present disclosure may obtain fingerprint image information from a user fingerprint to perform a fingerprint matching operation and may obtain fingerprint spectrum information from the user fingerprint to perform a liveness detection operation. By determining whether a user fingerprint is matched and whether the fingerprint is faked are determined, security and reliability of the electronic device may be improved.

According to the present disclosure, an electronic device and a fingerprint recognition device may perform a user fingerprint matching operation and may determine whether a user fingerprint is faked. Accordingly, an optics-based fingerprint sensor having improved reliability and security, an electronic device including the optics-based fingerprint sensor, and an operation method of the electronic device are provided.

While the present disclosure has been described with reference to example embodiments thereof, it will be apparent to those of ordinary skill in the art that various changes and modifications may be made thereto without departing from the spirit and scope of the present disclosure as set forth in the following claims.

What is claimed is:

1. An optics-based fingerprint sensor comprising:
a first photodiode;
a first metal shield structure formed on the first photodiode and comprising a first opening;
a first color filter structure formed on the first metal shield structure and comprising a second opening exposing the first opening;
a second photodiode spaced apart from the first photodiode by a predetermined distance;
a first nano-optical filter structure formed on the second photodiode; and
a first band limit filter structure formed on the first nano-optical filter structure.

2. The optics-based fingerprint sensor of claim 1, wherein the first metal shield structure and the first nano-optical filter structure are formed in a first layer disposed on the first photodiode and the second photodiode.

3. The optics-based fingerprint sensor of claim 2, wherein the first color filter structure and the first band limit filter structure are formed in a second layer disposed on the first layer.

4. The optics-based fingerprint sensor of claim 1, wherein the first band limit filter structure is configured to pass first wide band light, which belongs to a first band, of light reflected from a user fingerprint.

5. The optics-based fingerprint sensor of claim 4, wherein the first nano-optical filter structure comprises a plurality of holes each having a first diameter and is configured to pass only first narrow band light, which is determined according to the first diameter, of the first wide band light.

6. The optics-based fingerprint sensor of claim 4, wherein the first nano-optical filter structure comprises a plurality of discs each having a first diameter and is configured to block only first narrow band light, which is determined according to the first diameter, of the first wide band light.

7. The optics-based fingerprint sensor of claim 1, further comprising:
a third photodiode adjacent to the second photodiode;
a second nano-optical filter structure formed on the second photodiode; and
a second band limit filter structure formed on the second nano-optical filter structure,
wherein the first nano-optical filter structure and the second nano-optical filter structure have different optical characteristics from each other.

8. The optics-based fingerprint sensor of claim 7, further comprising:
a fourth photodiode adjacent to the first photodiode;
a second metal shield structure formed on the fourth photodiode and comprising a third opening; and
a second color filter structure formed on the second metal shield structure and comprising a fourth opening exposing the third opening.

9. The optics-based fingerprint sensor of claim 1, wherein the first color filter structure comprises:
a first color filter configured to pass first light, which corresponds to a first color, of light reflected from a user fingerprint; and
a second color filter formed on the first color filter and configured to transmit second light, which corresponds to a second color, of the reflected light.

10. The optics-based fingerprint sensor of claim 1, wherein the first color filter structure comprises:
a black color filter configured to block light reflected from the first metal shield structure.

11. The optics-based fingerprint sensor of claim 1, further comprising:
an optical lens formed on the first color filter structure and configured to focus light reflected from a user fingerprint.

12. The optics-based fingerprint sensor of claim 1, further comprising:
an infrared cut filter structure formed on the first color filter structure.

13. An optics-based fingerprint sensor comprising:
a first fingerprint pixel configured to output a first signal, based on a first intensity of light reflected from a user fingerprint;
a first spectrum pixel configured to output a second signal, based on a second intensity of first narrow band light, which has a first wavelength, of the reflected light; and
a sensor driver configured to:
control the first fingerprint pixel and the first spectrum pixel, to generate fingerprint image information about the user fingerprint, based on the first signal, and
generate fingerprint spectrum information about the user fingerprint, based on the second signal,
wherein the first spectrum pixel comprises:
a first band limit filter structure configured to pass first wide band light, which belongs to a first band, of the reflected light; and
a first nano-optical filter structure formed under the first band limit filter structure and configured to pass the first narrow band light of the first wide band light.

14. The optics-based fingerprint sensor of claim 13, wherein the first spectrum pixel further comprises:
a second photodiode formed under the first nano-optical filter structure and configured to output the second signal, based on the first narrow band light.

15. The optics-based fingerprint sensor of claim 14, wherein the first fingerprint pixel comprises:
an optical lens configured to focus the reflected light;
a first color filter structure formed under the optical lens and comprising a first opening configured to pass the focused reflected light;
a first metal shield structure formed under the first color filter structure and comprising a second opening configured to pass the reflected light passing through the first opening; and
a first photodiode configured to output the first signal, based on the reflected light passing through the second opening.

16. The optics-based fingerprint sensor of claim 15, wherein the first metal shield structure and the first nano-optical filter structure are formed in a first layer on the first photodiode and the second photodiode, and
wherein the first color filter structure and the first band limit filter structure are formed in a second layer on the first layer.

17. The optics-based fingerprint sensor of claim 15, wherein the first color filter structure comprises:
a first color filter configured to pass first light, which corresponds to a first color, of the reflected light; and
a second color filter configured to pass second light, which corresponds to a second color, of the reflected light.

18. The optics-based fingerprint sensor of claim 15, wherein the first fingerprint pixel further comprises:
an infrared cut filter formed between the optical lens and the first color filter structure.

19. The optics-based fingerprint sensor of claim 13, further comprising:
a second spectrum pixel configured to output a third signal, based on an intensity of second narrow band light, which has a second wavelength, of the reflected light,
wherein the sensor driver generates the fingerprint spectrum information, based on the second signal and the third signal.

20. The optics-based fingerprint sensor of claim 13, further comprising:
a dummy area interposed between the first fingerprint pixel and the first spectrum pixel.

* * * * *